US012596260B1

(12) United States Patent
Plopski et al.

(10) Patent No.: US 12,596,260 B1
(45) Date of Patent: Apr. 7, 2026

(54) NEAR-EYE DISPLAY USING PINHOLE APERTURE ARRAY

(71) Applicant: Snap Inc., Santa Monica, CA (US)

(72) Inventors: Alexander Plopski, Graz (AT); Xiaodan Hu, Graz (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/175,389

(22) Filed: Apr. 10, 2025

(51) Int. Cl.
G02B 27/01 (2006.01)
G09G 3/00 (2006.01)
G09G 3/36 (2006.01)

(52) U.S. Cl.
CPC ......... G02B 27/0172 (2013.01); G09G 3/003 (2013.01); G09G 3/36 (2013.01); G02B 2027/0118 (2013.01); G09G 2320/0209 (2013.01); G09G 2320/0233 (2013.01); G09G 2320/066 (2013.01); G09G 2340/0435 (2013.01); G09G 2354/00 (2013.01)

(58) Field of Classification Search
None
See application file for complete search history.

(56) References Cited

PUBLICATIONS

Aksit, Kaan, "Slim near-eye display using pinhole aperture arrays", Applied Optics, vol. 54, No. 11, (Apr. 9, 2015), 3422-3427.
Hu, Xiaodan, "Pinhole Occlusion: Enhancing Soft-Edge Occlusion Using a Dynamic Pinhole Array", IEEE Conference on Virtual Reality and 3D User Interfaces Abstracts and Workshops (VRW), (2024), 719-720.
Lee, Hyeontaek, "Near eye display based on multiplexed retinal projections for robust compensation of eye pupil variance", Optics Express, vol. 32, No. 2, (Jan. 12, 2024), 2631-2643.
Yao, Cheng, "Uniform Luminance Light Field Near Eye Display using Pinhole Arrays and Gradual Virtual Apertures", International Conference on Virtual Reality and Visualization, (2016), 401-406.

*Primary Examiner* — Aneeta Yodichkas
(74) *Attorney, Agent, or Firm* — Schwegman Lundberg & Woessner, P.A.

(57) ABSTRACT

Systems and methods described herein relate to a near-eye display using a pinhole aperture array. In some examples, a near-eye display system includes a ray-limiting structure to provide a pinhole aperture array with a plurality of apertures. The plurality of apertures can each have a shape defined by radially extending elements. Examples also describe extended reality (XR) devices including such a near-eye display system and methods utilizing the near-eye display system.

20 Claims, 15 Drawing Sheets

900

1000

1100

1204

1202

1300

REAL-WORLD ENVIRONMENT

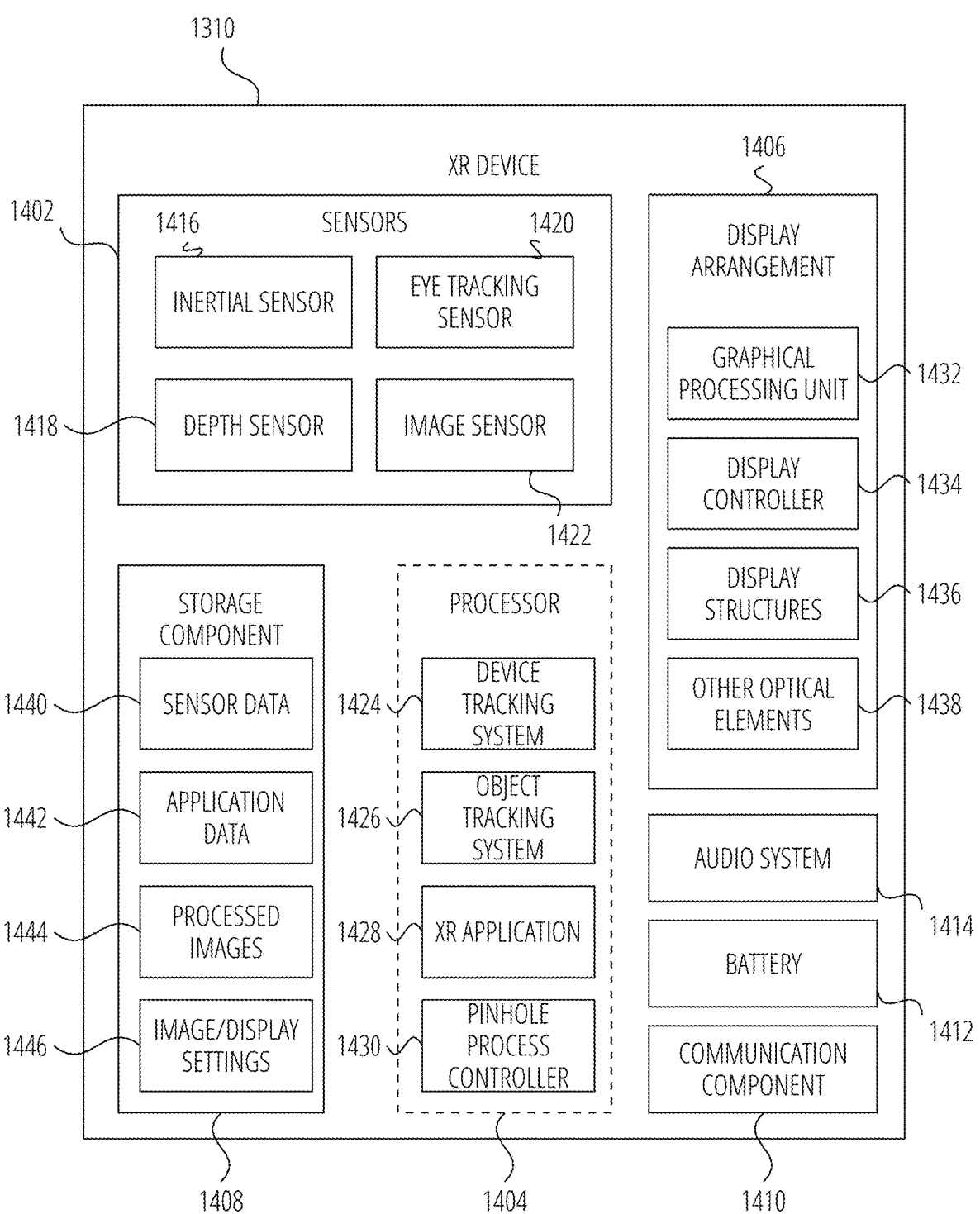

1310

1406

XR DEVICE

1402

SENSORS
1416
1420

INERTIAL SENSOR

EYE TRACKING SENSOR

1418

DEPTH SENSOR

IMAGE SENSOR

1422

DISPLAY ARRANGEMENT

GRAPHICAL PROCESSING UNIT — 1432

DISPLAY CONTROLLER — 1434

DISPLAY STRUCTURES — 1436

OTHER OPTICAL ELEMENTS — 1438

STORAGE COMPONENT

1440 — SENSOR DATA

1442 — APPLICATION DATA

1444 — PROCESSED IMAGES

1446 — IMAGE/DISPLAY SETTINGS

PROCESSOR

1424 — DEVICE TRACKING SYSTEM

1426 — OBJECT TRACKING SYSTEM

1428 — XR APPLICATION

1430 — PINHOLE PROCESS CONTROLLER

AUDIO SYSTEM

1414

BATTERY

1412

COMMUNICATION COMPONENT 1408          1404          1410

START — 1602

COMPUTE PINHOLE ARRANGEMENT — 1604

GENERATE VIRTUAL CONTENT — 1606

GENERATE OCCLUSION MASK — 1608

DISPLAY PINHOLE ARRAY AND VIRTUAL IMAGES — 1610

DISPLAY OCCLUSION MASK — 1612

PERFORM TRACKING — 1614

DYNAMICALLY ADJUST ONE OR MORE OF PINHOLE ARRAY, VIRTUAL CONTENT, OR OCCLUSION MASK — 1616

END — 1618

FIG. 18

NEAR-EYE DISPLAY USING PINHOLE APERTURE ARRAY

TECHNICAL FIELD

Subject matter disclosed herein relates to display systems, including near-eye display systems that provide pinhole aperture arrays. The subject matter also includes extended reality (XR) devices that include such near-eye display systems.

BACKGROUND

Near-eye display technologies have evolved over the years. Pinhole-based displays represent a category of optical systems that use arrays of small apertures (or "pinholes") to control light transmission. This approach may reduce costs or the need for refractory optics, but achieving sufficient image quality with pinhole-based technology is technically challenging.

BRIEF DESCRIPTION OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which:

FIG. 14 is a block diagram illustrating components of an XR device, according to some examples.

FIG. 15 is a diagrammatic representation of a near-eye display system for an XR device, according to some examples.

FIG. 18 is a diagrammatic illustration of a software architecture within which the present disclosure may be implemented, according to some examples.

DETAILED DESCRIPTION

Figure 1:
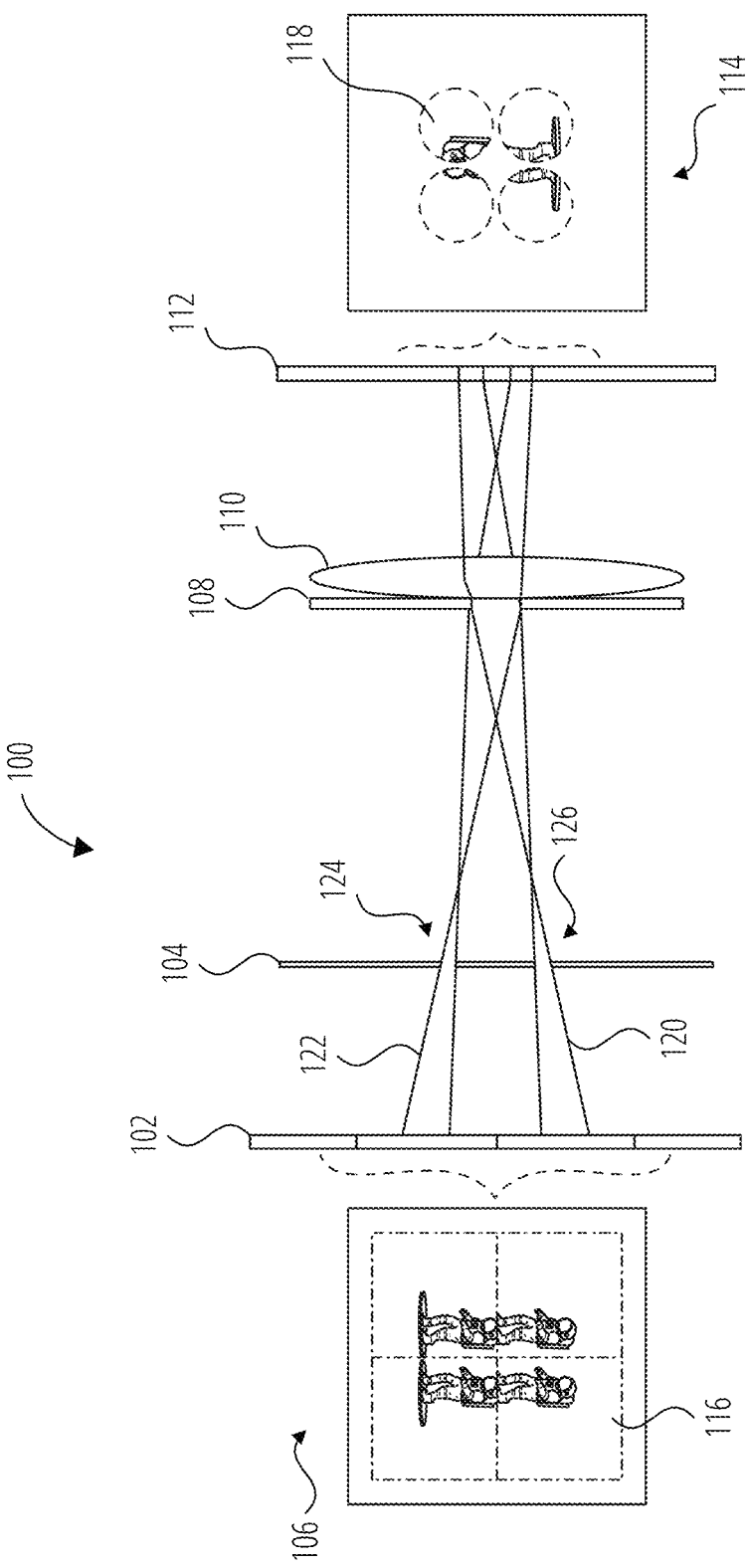
FIG. 1 is a diagrammatic representation of a near-eye display system, according to some examples.

Pinhole aperture arrays can be controlled to manipulate light transmission and distribution. This can allow for a better visual experience (e.g., by providing extended depth of field) and makes pinhole aperture arrays useful in, for example, light field displays.

When using a conventional pinhole aperture array with circular apertures, due to the aperture shape and finite pupil size, each defocused pinhole produces an enlarged circular blur spot on the retina. Typically, an image is decomposed into multiple elemental images according to a pinhole array pattern, such that each elemental image passes through a corresponding pinhole and recombines on the retina to reconstruct the original image.

Conventional pinhole-based displays face several specific technical challenges. First, circular apertures create inefficient light distribution patterns when defocused, resulting in either visible dark gaps between apertures or contrast distortion from overlapping patterns. For example, overlapping blur spots lead to overlapping elemental images, resulting in regions of higher pixel intensity, degrading image quality. Second, existing designs struggle to maintain uniform brightness across the viewing field. Third, the trade-off between aperture size and image clarity has traditionally limited the practical application of pinhole-based displays in near-eye implementations. These technical limitations have hindered the widespread adoption of pinhole-based displays in XR applications despite their potential advantages in cost and form factor.

The present disclosure provides an approach to near-eye display technology that addresses technical challenges and can be applied in light field and occlusion displays. In some examples, a pinhole aperture array provides apertures that have shapes defined by radially extending elements. These can include line-based aperture designs, such as substantially cross-shaped or substantially star-shaped apertures that have intersecting lines or strokes. Such aperture designs provide improved overall image quality. For example, when compared to conventional pinhole aperture arrays that rely on circular apertures, examples in the present disclosure can achieve more complete or denser tiling in an image plane to mitigate at least some of the aforementioned visual issues.

In some examples, a near-eye display system includes multiple layers that work together, such as a pinhole display layer, an occlusion mask display layer, and, for XR implementations, a content display layer that presents virtual content. The near-eye display system may operate to dynamically adjust pinhole arrangements and displayed content.

An example near-eye display system includes at least one ray-limiting structure to provide a pinhole aperture array defining a plurality of substantially apertures, where the apertures have shapes defined by radially extending elements. For example, the apertures are spaced apart in an array or pattern, and each aperture has a shape defined by intersecting radially extending elements, such as multiple lines or elongate elements that extend radially from a central point of the aperture. The near-eye display system may form part of an XR device.

Different types of aperture shapes can be provided, such as substantially cross-shaped apertures (e.g., X-shaped or plus-shaped), or substantially star-shaped apertures, and various examples are included in the present disclosure. In some examples, the apertures each have a line width of less than 0.15 mm. A cross-shaped aperture may be defined by a pair of intersecting lines. A star-shaped aperture may be defined by at least three lines that all intersect at a central point of the aperture.

The ray-limiting structure selectively controls the passage of light rays and may be implemented using different technologies, including a programmable display that dynamically renders the pinhole aperture array. In some examples, the ray-limiting structure comprises a transmissive spatial light modulator (SLM) layer, which may be implemented as a liquid-crystal display (LCD) panel. The LCD panel allows for dynamic rendering and adjustment of the pinhole aperture array.

In some examples, the pinhole aperture array is provided such that the apertures have non-uniform light transmission profiles. For example, a gradual change in aperture transmission profile (e.g., in edge regions) can be introduced using functions such as a smooth symmetric gradient function or logit function.

The near-eye display system may include a suitable content display structure, such as an LCD panel or screen, to display elemental images. These elemental images are designed to work with the apertures, taking into account how light transforms when passing through such apertures.

In addition to the content display structure, or as an alternative to the content display structure, the near-eye display system may include a further ray-limiting structure to selectively block environmental light. Such a further ray-limiting structure can provide occlusion capabilities (e.g., for optical see-through XR implementations).

For example, the further ray-limiting structure may provide an occlusion mask by controlling a transmissive SLM layer or other light control structure. In some examples, the occlusion mask is a pattern (e.g., pixel-level pattern) used to selectively block or attenuate light in specific regions of a display or optical system. The occlusion mask can be generated based on image or scene data, where regions of interest—such as bright areas or visual obstructions—are identified and assigned lower transmittance values. Optimization processes may be applied to adjust the mask shape or intensity distribution.

Together with a pinhole aperture array, an occlusion mask can facilitate projection of a sharp image. For example, an occlusion mask alone may dim source light but cause blurriness due to its positioning relative to a focal plane. However, when the pinhole aperture array is appropriately positioned between the occlusion mask and a user (e.g., an observer), the relevant light source may project a sharp image on an image plane.

From an occlusion mask perspective, examples described herein provide a pinhole array-based device that creates a sharp occlusion mask without the need for a bulky setup, e.g., having only two transparent LCD layers. By rendering a pinhole array on a layer closer to the user's eye, the device can provide a programmable aperture layer that extends the effective depth of field and improves the sharpness of the occlusion mask rendered on a second layer.

In some examples, a device provides soft-edge occlusion capabilities. When a user focuses on distant scenes, an occlusion mask positioned at close range appears blurred. Examples described herein modulate the shape of the pinhole apertures to balance occlusion bleeding with retinal tiling, resulting in a more uniform mask with higher contrast.

In some examples, the near-eye display system includes an eye tracker to track the eyes of the user to obtain eye tracking data. The ray-limiting structure can dynamically adjust the pinhole aperture array based on this eye tracking data, which may include pupil size data, focusing distance, or gaze direction data. In some examples, the occlusion mask is also dynamically adjusted based on one or more of these factors.

The present disclosure provides technological solutions to technological problems. For example, when light passes through apertures as described herein and is defocused, light patterns can transform into patterns that allow for better (e.g., more complete) tiling. For example, the customized aperture shapes described herein can provide diamond-like, square-like, or hexagon-like patterns that are better suited to tiling than substantially circular shapes.

By specifically selecting or controlling parameters such as center-to-center distance between apertures and aperture light transmission intensities, overall uniformity of light distribution can be improved. Moreover, examples in the present disclosure provide an improved pinhole geometry which can be a less complex and resource-intensive approach than other techniques that seek to improve image quality, such as time-multiplexing pinhole display techniques. Examples herein can thus provide a simpler optical stack that reduces manufacturing complexity or overall device thickness.

Pinhole aperture arrays as described herein can be applied in various scenarios. A first example use case is a pure occlusion display, which may be suitable for applications that benefit from selective environmental filtering, such as blocking unwanted content (e.g., advertisements or other media content) or specific objects in a field of view of a user. A second example use case is the use of the pinhole aperture array with an occlusion mask that provides a specific pattern to create a desired visual effect.

A third example use case is an augmented reality (AR) device. The AR device may provide a pinhole aperture array, an occlusion mask, and a virtual content layer (and, in at least some cases, an optical combiner to allow a user to view virtual content). Such a configuration provides optical see-through capabilities and can enable AR experiences by selectively blocking portions of the real world where virtual content should appear while overlaying virtual imagery.

A fourth example use case is a virtual reality (VR) device. In such a configuration, a fully virtual experience is provided as opposed to, for example, an optical see-through implementation. This may be achieved by completely blocking out the real world and displaying virtual content to a user, while utilizing an optical arrangement that includes a pinhole aperture array as described herein.

FIG. 1 is a diagrammatic representation of a near-eye display system 100, according to some examples. The near-eye display system 100 includes a content display panel 102 and a pinhole display panel 104 spaced apart from the content display panel 102.

The content display panel 102 outputs visual content, such as virtual images, to a user. The content display panel 102 may be implemented as an SLM, such as an LCD panel. In various examples, the content display panel 102 displays elemental images, as discussed further below. The content display panel 102 may be positioned at a specific distance an eye of a user of the near-eye display system 100, such as around 45-50 mm from an eye iris 108 shown in FIG. 1 (taken along an optical path).

The pinhole display panel 104 functions as a ray-limiting structure that defines a plurality of apertures, such as aperture 124 and aperture 126 depicted in FIG. 1. The pinhole display panel 104 may be implemented on a transparent SLM, such as an LCD panel, allowing for dynamic rendering and adjustment of apertures. For example, the content display panel 102 is an LCD panel with a resolution of 1024×768 pixels and a pixel pitch of 0.036 mm.

As is conceptually illustrated in FIG. 1 (see, for example, light path 120 and light path 122), the pinhole display panel 104 controls how light passes through the near-eye display system 100 and reaches the eye iris 108 and eye lens 110 of the user, with the eye lens 110 focusing the light on a retinal surface 112 of the user such that the user perceives an overall retinal projection 114.

To provide a desired appearance in the overall retinal projection 114, the near-eye display system 100 generates elemental images through a computational process that considers how the pinhole aperture array affects light transmission, accounting for aspects such as pinhole shape, arrangement, image alignment, curvature, and/or overlap. FIG. 1 illustrates an elemental image array 106 that includes a set of individual image elements generated for viewing through the pinhole display panel 104.

The elemental images may thus be in the form of sub-images that are specifically generated to be viewed through corresponding apertures in the pinhole display panel 104 to collectively form a complete image on a viewing plane, such as the overall retinal projection 114 formed on the retinal surface 112. In some examples, each elemental image corresponds to a specific aperture in the pinhole display panel 104 and contains a portion of the final image that will be observed. For example, elemental image 116 ultimately forms retinal projection 118 that is part of the final observed image.

Where virtual content is presented in an XR use case, when viewed through pinhole display panel 104, directional light rays from elemental images can be constructed such that the user's eye interprets the overall retinal projection 114 as coherent 3D virtual content.

It is noted that FIG. 1 is merely a diagrammatic illustration, and a pinhole display panel may typically include an array of more than four apertures, with an elemental image array of more than four sub-images being generated.

The overall retinal projection 114 represents the image formed on the retinal surface 112 from the elemental images passing through corresponding apertures in the pinhole display panel 104. Characteristics such as shape and clarity of each individual retinal projection (e.g., the retinal projection 118) are influenced by the shape of the corresponding pinhole in the pinhole display panel 104 and the defocusing effect that occurs when the pinhole is viewed from a distance. Where projections overlap, such overlapping can also influence the shape and clarity of the resulting projection.

As mentioned above, conventional approaches employing circular apertures can result in technical problems. To illustrate this, FIG. 1 shows the retinal projection 118 as a projection created when using substantially circular apertures in the pinhole display panel 104. The circular apertures result in circular patterns formed on the retinal surface 112, such as retinal projection 118 that results from light associated with elemental image 116 passing through a corresponding aperture.

Circular patterns may result in one or multiple drawbacks, such as visible dark gaps that appear when apertures are farther apart, or distorted contrast distribution caused by overlapping defocused patterns when apertures are closer together to eliminate gaps. This can produce an overall intensity distribution that lacks uniformity, thus leading to unsatisfactory image quality.

Examples in the present disclosure utilize a pinhole aperture array with apertures that have shapes defined by radially extending elements, such as multiple elements extending radially from a central or near-central point. An aperture may include an opening for light to pass through, a light-transmissive region or zone (e.g., a transparent region or partially transparent region), or a combination thereof, that has or resembles a cross shape or cross-like shape, or a star shape or star-like shape. The aperture may be fully open or transparent or may have varying degrees of light transmission across its surface or profile, including regions with gradual transitions from opaque to transparent.

An may include an opening or transparent region formed by two intersecting lines or segments that create a cross-like shape, or by three or more intersecting lines or segments that create a star-like shape. For example, a substantially cross-shaped aperture may be configured in various forms, including an X-shaped aperture where the diagonals of a square form the opening (e.g., providing a path for light to traverse), or a plus-shaped aperture where the midlines of a square form the opening.

Figure 2:
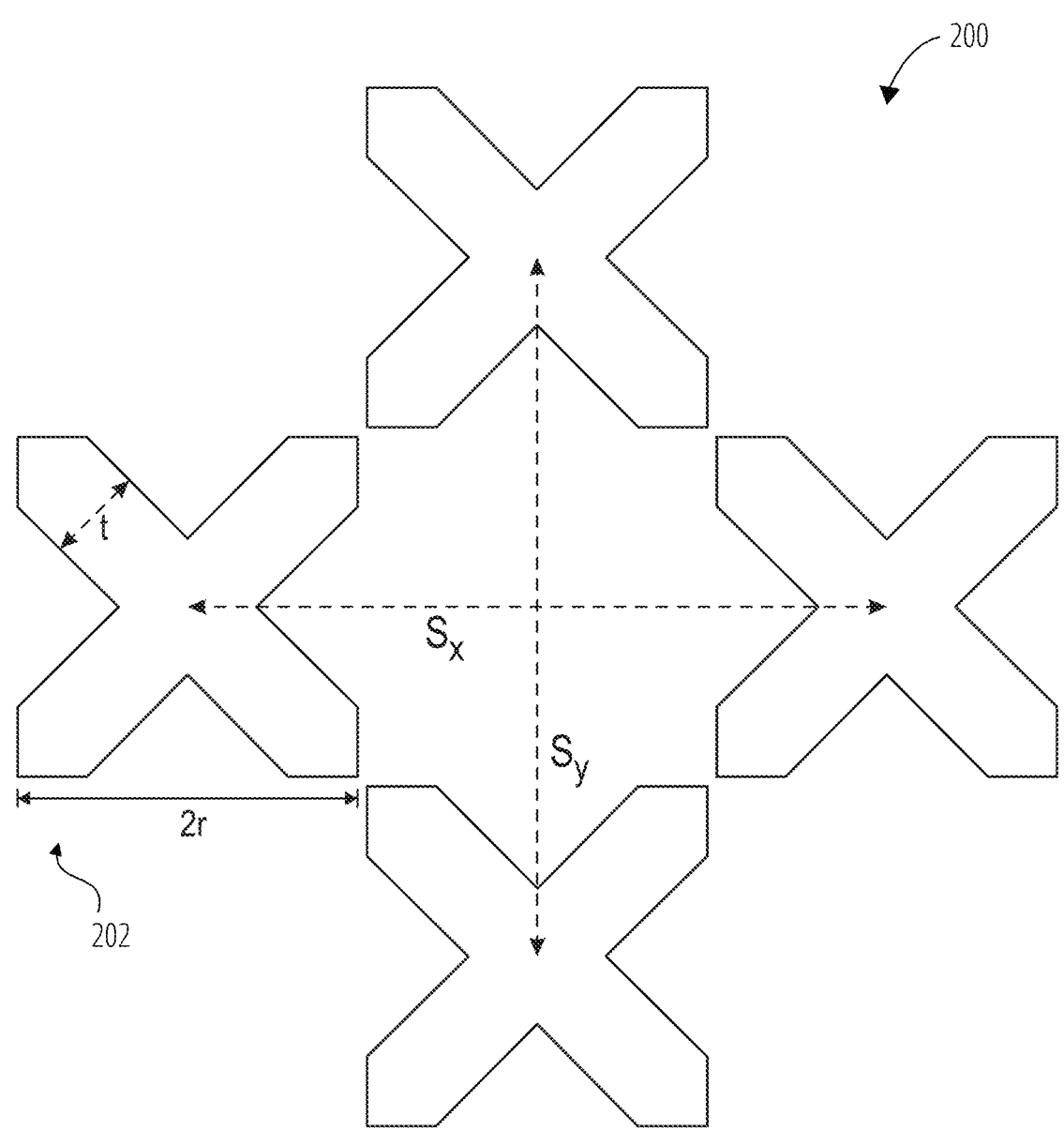
FIG. 2 is a diagrammatic representation of part of a pinhole aperture array, according to some examples.

FIG. 2 shows part of a pinhole aperture array 200, according to some examples. The pinhole aperture array 200 includes apertures such as aperture 202. The aperture 202 is constructed within a square of side length $2r$, where the diagonals of the square are filled to form an X-shaped when the aperture 202 is viewed from the front or rear. In use, light can thus pass through the X-shaped area but not through the surrounding areas of the square.

The pinhole aperture array 200 is arranged with a horizontal center-to-center distance $S_x$ between adjacent apertures and a vertical center-to-center distance $S_y$ between apertures. The width of the lines forming the X-shaped apertures is denoted by t. In use, a smaller t reduces incoming light but may yield a clearer image. In some examples, the width t can be set to 2 or 3 pixels (e.g., 0.072 mm or 0.108 mm where pixel pitch is 0.036 mm) to strike a balance between light throughput and image clarity.

Various different pinhole pitches (S-values) can be used, such as pitches of between around 80 to 120 pixels (where pixel pitch is 0.036 mm) and the length $2r$ could for example be between around 70 pixels and around 110 pixels. In one example, r is set at about $\sigma_p$ ($\sigma_p$ is discussed further below).

The pinhole aperture array 200 may be implemented on a programmable display such as a transparent SLM that can dynamically render and adjust the pinhole aperture array 200 (e.g., to adjust t, $S_x$, or $S_y$). The overall array layout and number of apertures in the pinhole aperture array 200 can depend on the implementation and various factors, such as the size of the pinhole display, the size of the content display, the type of content to display, the distance between the pinhole display and the content display, and the desired field of view.

When an aperture of a pinhole aperture array is placed closer to a user's eye than the focal distance (which is typically about 1 meter for XR displays), the aperture appears out of focus to the user. The specific defocus effect or result depends on the particular design of the aperture.

Figure 3:
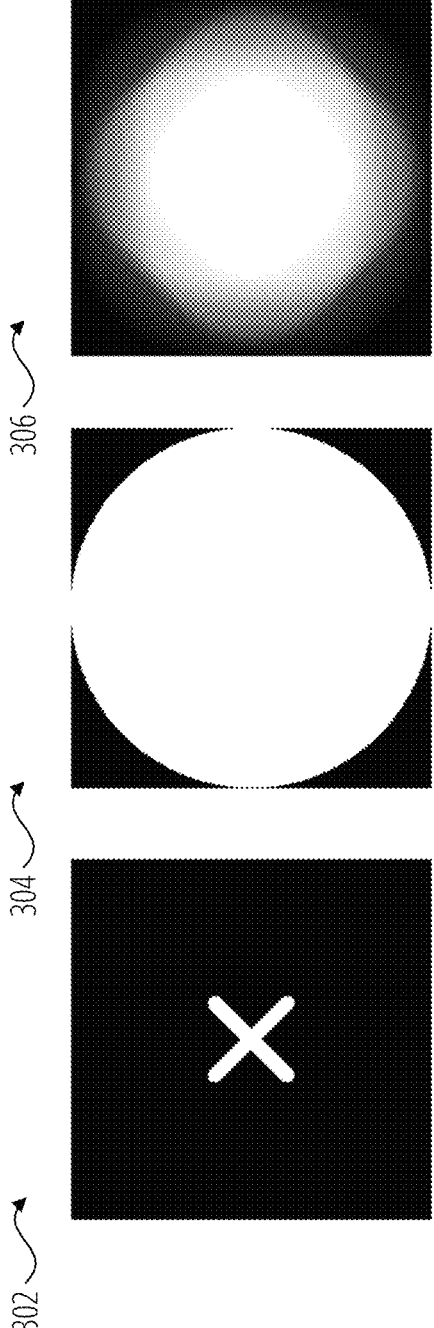
FIG. 3 is a diagrammatic illustration of convolution of an aperture with a circular kernel, according to some examples.

A defocus effect can be modeled mathematically as a convolution operation. As a conceptual example, this is illustrated in FIG. 3 for an example X-shaped aperture. FIG. 3 shows an initial image 302 representing the example X-shaped aperture, a filter 304 representing a circular kernel, and a resultant image 306 showing the defocused appearance of the X-shaped aperture, according to some examples. This demonstrates how a cross-shaped aperture may be utilized to produce diamond-shaped patterns or a pattern resembling such shapes when defocused. This may enable more complete or uniform tiling of light patterns.

Figure 4:
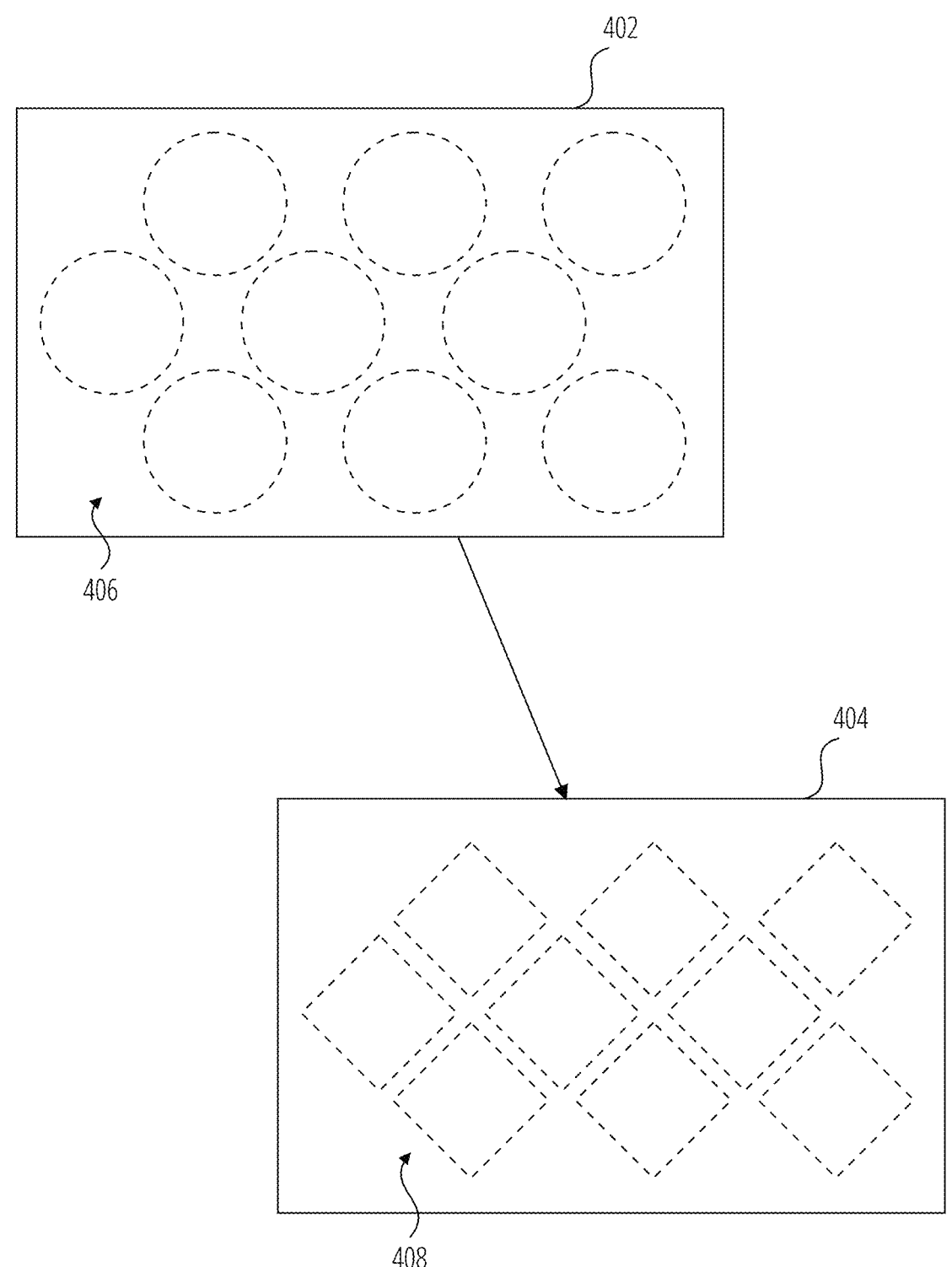
FIG. 4 is a comparative diagram illustrating tiling when using different aperture designs, according to some examples.

FIG. 4 is a comparative diagram illustrating tiling when using two different aperture designs, according to some examples. FIG. 4 conceptually shows an observed image 402 resulting from the use of circular apertures and an observed image 404 resulting from the use of substantially X-shaped apertures, according to some examples.

The observed image 402 illustrates tiling 406 that represents the arrangement of circular patterns. In such an arrangement, it may be technically challenging to achieve sufficiently complete tiling without overly large gaps or uneven brightness. The observed image 404 illustrates tiling 408 that represents the arrangement of diamond-shaped patterns that may result from employing X-shaped apertures, according to some examples.

Figure 5:
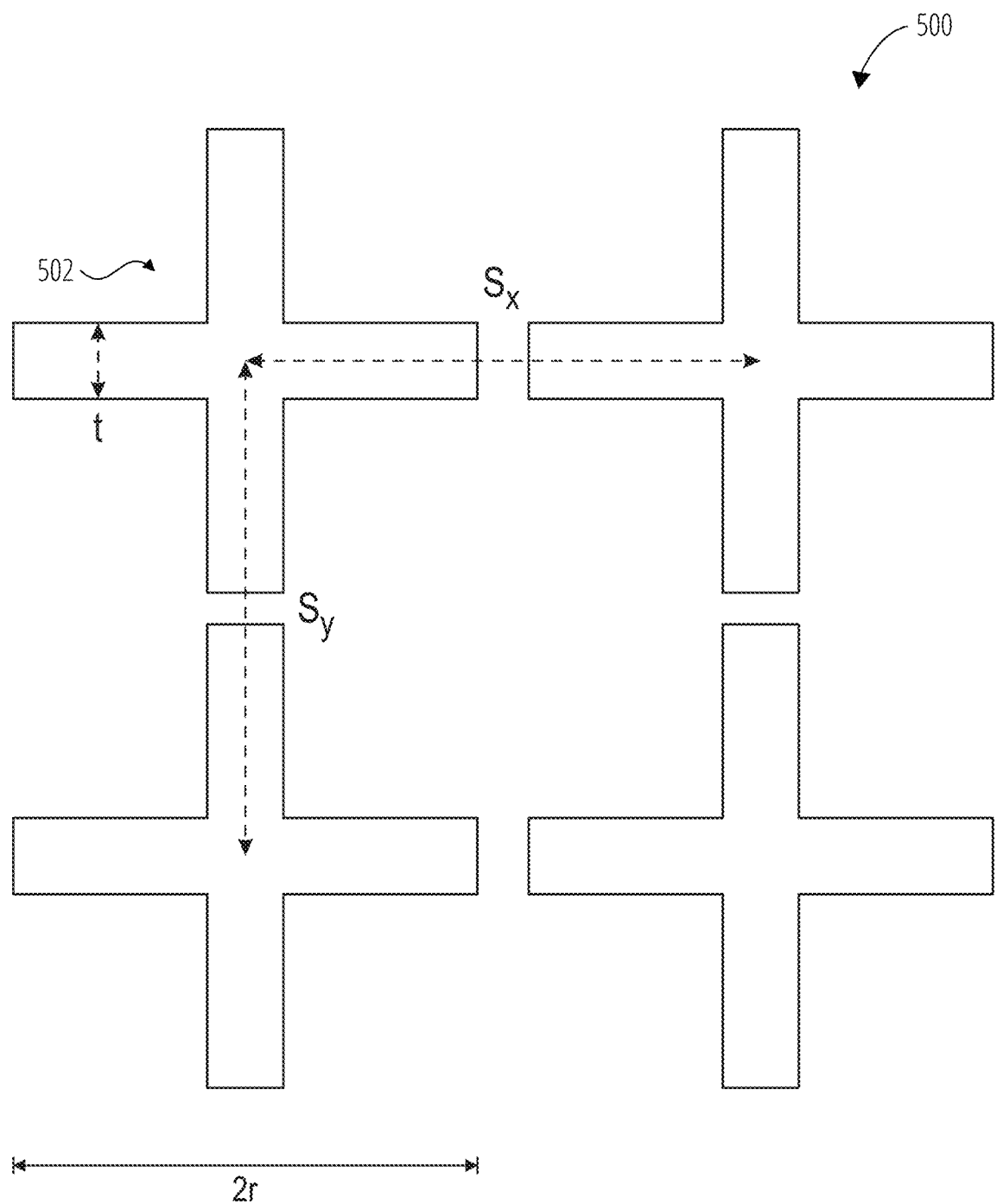
FIG. 5 is a diagrammatic representation of part of a pinhole aperture array, according to some examples.

FIG. 5 shows part of a pinhole aperture array 500, according to some examples. The pinhole aperture array 500 includes plus-shaped apertures such as an aperture 502. The aperture 502 is constructed within a square of side length 2r, where the midlines of the square are filled to form a plus-shape when the aperture 502 is viewed from the front or rear. In use, light can thus pass through the plus-shaped area but not through the surrounding areas of the square.

The pinhole aperture array 500 is arranged with a horizontal center-to-center distance $S_x$ between adjacent apertures and a vertical center-to-center distance $S_y$ between apertures. The width of the lines forming the plus-shaped apertures is denoted by t. As mentioned, in some examples, the width t can be set to 2 or 3 pixels (e.g., 0.072 mm or 0.108 mm). The pinhole aperture array 500 may be implemented on a programmable display such as a transparent SLM.

When defocused (and depending on the specific aperture design), a pinhole aperture array with plus-shaped apertures may produce a pattern with square-like projections. This may also enable more complete or uniform tiling of light patterns.

Further to the aforementioned conceptual example, and as a more specific example, it is possible to model defocus by convolving an aperture's (ideal) original intensity distribution with a suitable point spread function (PSF). For example:

$$I_1(x,y)=P(x,y)\otimes H_p(x,y),$$

where $\otimes$ denotes the convolution operator, $P(x, y)$ is the original intensity distribution of the aperture, and $H_p(x, y)$ represents the defocus PSF.

Assuming blur is a simple uniform disk, then $H_p(x, y)$ can be written as a pillbox function:

$$H_p(x, y) = \begin{cases} \dfrac{1}{\pi\sigma_p^2}, & x^2 + y^2 \le \sigma_p^2, \\ 0, & \text{otherwise.} \end{cases}$$

Here, $\sigma_p$ is the radius of the PSF in the image plane. When a plus-shaped aperture such as the aperture 502 is convolved with a PSF of sufficiently large blur radius, the resulting pattern approximates a square or square-like shape.

Figure 6:
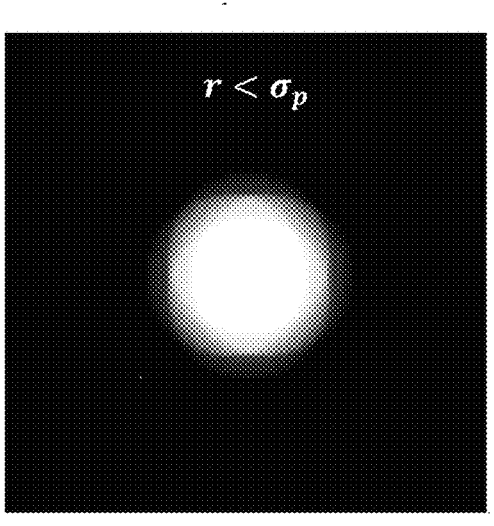
FIG. 6 is a diagrammatic illustration of a defocused appearance of an aperture, according to some examples.
Figure 7:
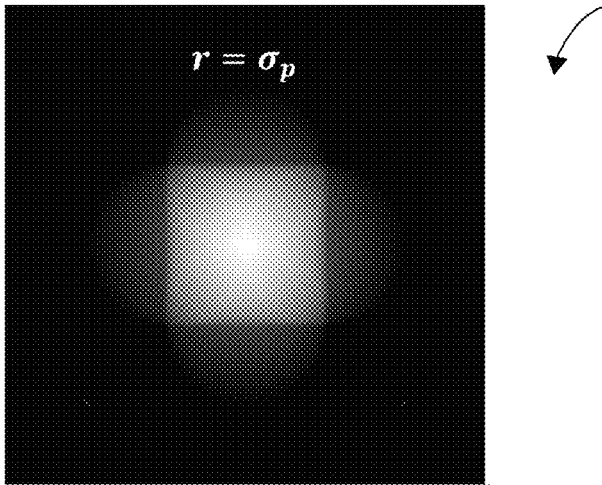
FIG. 7 is a diagrammatic illustration of a defocused appearance of a further aperture, according to some examples.
Figure 8:
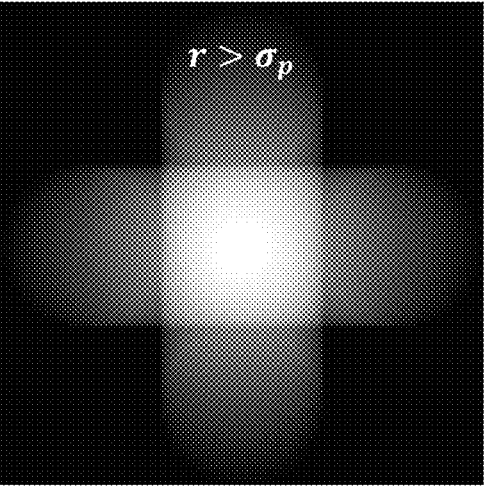
FIG. 8 is a diagrammatic illustration of a defocused appearance of a further aperture, according to some examples.

In the aperture 502, the length of each line is related to the curvature of the corners in the defocused image, which often appears square-like. For example, when using the pillbox function and where $\sigma_p$ is the PSF radius, it is possible to consider a plus-shaped aperture as follows. When $r=\sigma_p$, the defocused plus-shaped aperture appears substantially as a square spot (see, for example, FIG. 7 which shows an example out-of-focus view 700). If $r>\sigma_p$, the four edges of that square spot extend outward, gradually forming an enlarged plus shape (see, for example, FIG. 8 which shows an example out-of-focus view 800). Conversely, if $r<\sigma_p$, the curvature radius of the square's corners increases (see, for example, FIG. 6 which shows an example out-of-focus view 600). In the limit as $r\to0$, the corner curvature radius approaches $\sigma_p$.

The pinhole pitch is related to the overlap ratio of the defocused square spots. In some examples, when using a plus-shaped aperture, for example, if $S_x=S_y=\sigma_p$, the square spots do not overlap. Intensity near the edges of the defocused square spots is lower than at the center. If the spots do not overlap, the overall intensity distribution becomes non-uniform. Allowing a slight overlap, however, may improve overall uniformity of light distribution. Consequently, a certain degree of overlap may be obtained if $S_x=S_y<\sigma_p$.

In an ideal scenario, it may be possible to determine a desired pinhole shape by taking the deconvolution of desired tiling shapes (e.g., squares or hexagons). However, given that in reality the PSF may be large under typical viewing conditions, a stable deconvolution is impractical due to the resulting ill-posed inverse problem. Thus, as an alternative, aperture designs such as cross shapes and star shapes can be employed since their convolutions with a large circular PSF may naturally yield blurred shapes that may closely approximate uniform-tileable patterns.

A ray-limiting structure, such as a programmable SLM, can be used to dynamically render an array of apertures with substantially cross-shaped or substantially star-shaped individual aperture designs. In some examples, an aperture of the present disclosure has a non-uniform light transmission profile.

Figure 9:
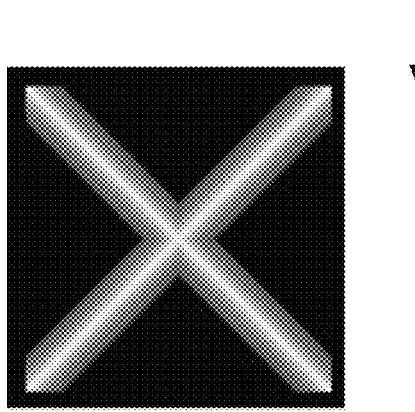
FIG. 9 is a diagrammatic illustration of a design for an aperture with a non-uniform light transmission profile, according to some examples.
Figure 10:
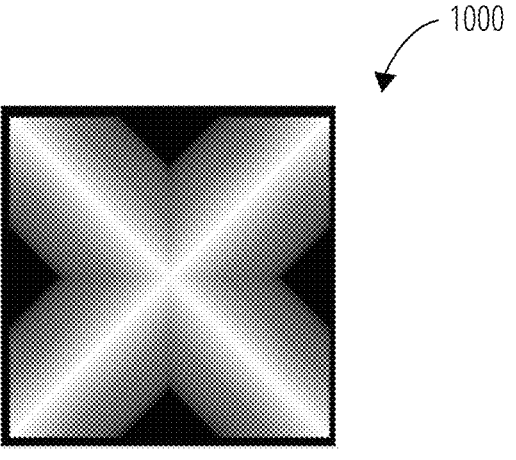
FIG. 10 is a diagrammatic illustration of a further design for an aperture with a non-uniform light transmission profile, according to some examples.
Figure 11:
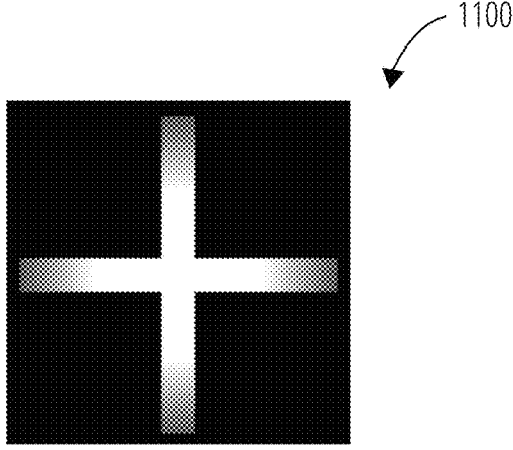
FIG. 11 is a diagrammatic illustration of a further design for an aperture with a non-uniform light transmission profile, according to some examples.

FIG. 9 to FIG. 11 illustrate three different examples, each with non-uniform profiles of cross-shaped apertures that provide fading edge regions. In these figures, lighter areas signify more transmissive regions while darker areas signify less transmissive regions (e.g., black signifies no transmission).

As a first example, an aperture design 900 in FIG. 9 illustrates an X-shaped aperture. A light transmission profile shown in FIG. 9 indicates that the diagonal arms of the aperture transmit the most light at their centerlines and gradually decrease in transmission outward, as indicated by the smooth gradient to black at the edges. The transmission is symmetrical about the diagonals, and there is no transmission outside the diagonals, providing for selective and controlled operation.

As a second example, an aperture design 1000 in FIG. 10 also illustrates an X-shaped aperture, but with broader transmissive regions than the aperture design 900. The most transmissive points are at the center and directly along the diagonals, with a continuous, smooth decay of transmission intensity toward all four corners, creating a diamond-like pattern. The completely non-transmissive areas take up less of the overall area, relative to the aperture design 900 of FIG. 9.

As a third example, an aperture design 1100 in FIG. 11 illustrates a plus-shaped aperture with gradually fading edges. In the aperture design 1100, the central region where the bars intersect has the highest transmission intensity. Moving outward along each arm of the plus sign, the brightness gradually fades to black at the edges, based on a smooth gradient of decreasing transmission.

Figure 12:
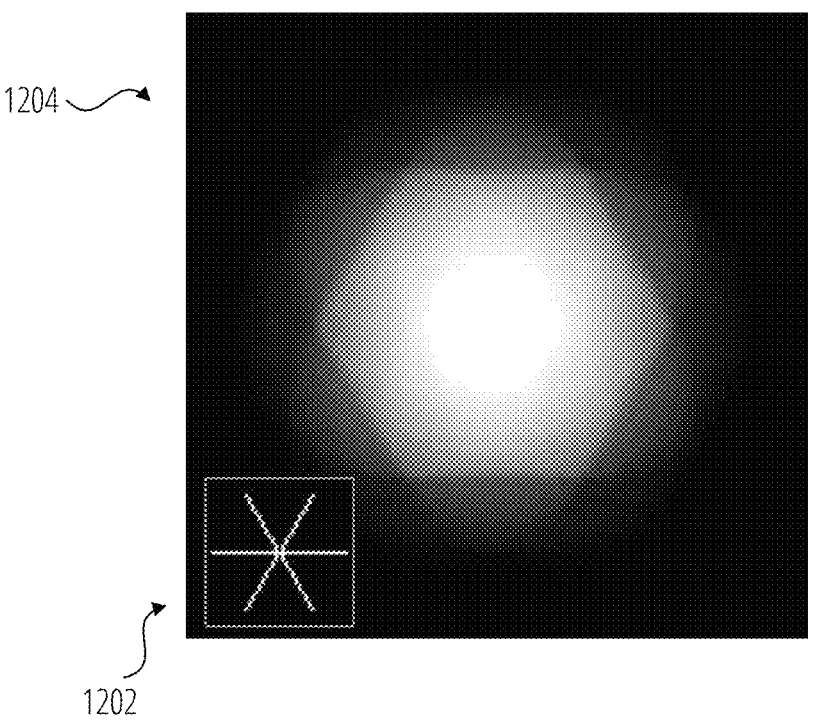
FIG. 12 is a diagrammatic illustration of both a design for an aperture and a defocused appearance associated with the aperture, according to some examples.

As a further conceptual example, FIG. 12 shows an aperture design 1202 for a star-shaped aperture. The aperture design 1202, which is the shape of the actual aperture and is shown in the bottom left corner of FIG. 12, includes three intersecting lines that meet at a central point and extend radially outward. FIG. 12 also shows an out-of-focus view 1204 that illustrates how the aperture design 1202 may produce hexagon-like patterns to enable more complete or uniform tiling of light patterns.

Figure 13:
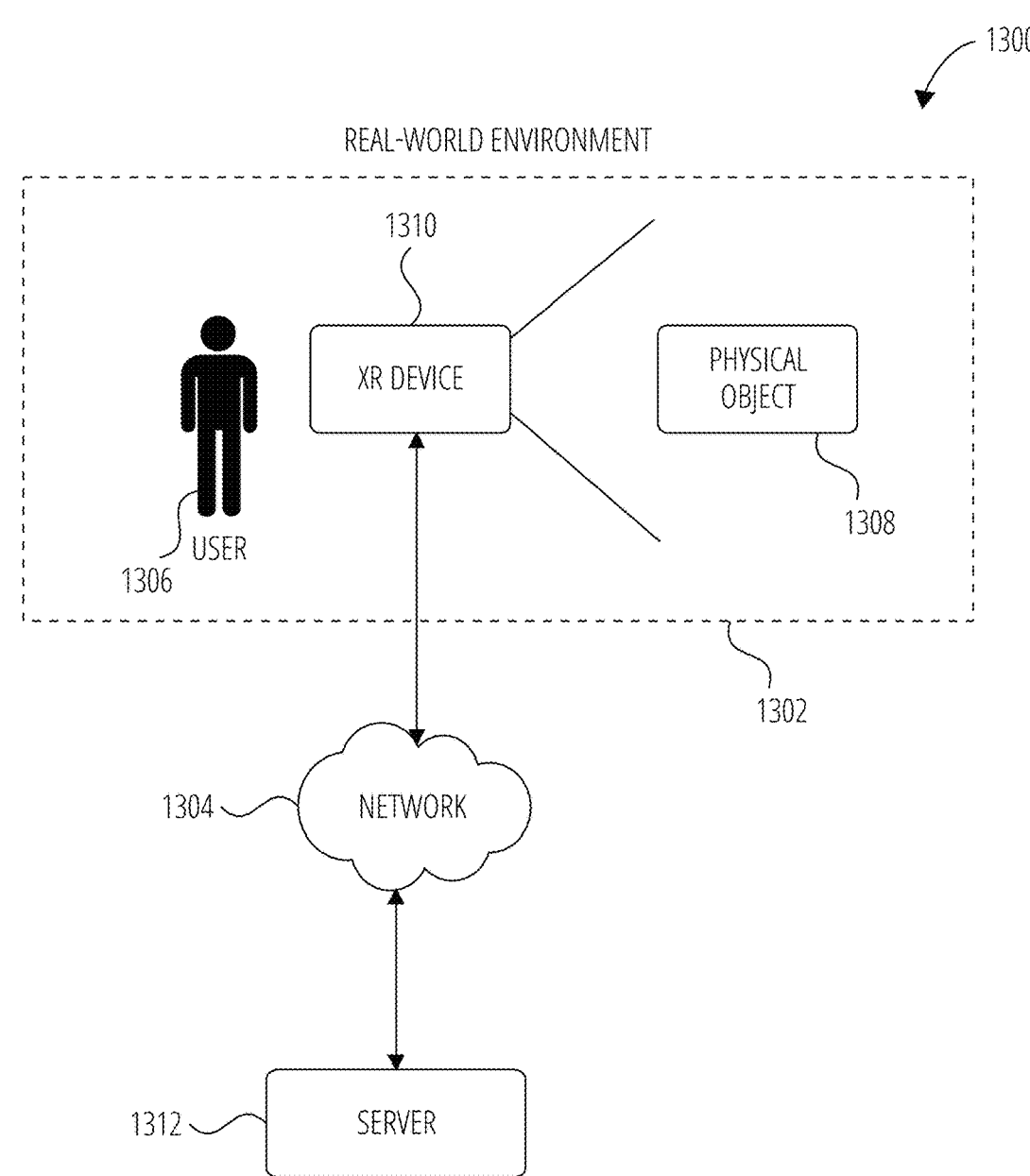
FIG. 13 is a block diagram illustrating a network environment for operating an XR device, according to some examples.

FIG. 13 is a network diagram illustrating a network environment 1300 suitable for operating an XR device 1310, according to some examples. The network environment 1300 includes an XR device 1310 and a server 1312, communicatively coupled to each other via a network 1304. The server 1312 may be part of a network-based system. For example, the network-based system can be or include a cloud-based server system that provides additional information, such as virtual content (e.g., 3D models of virtual objects, or augmentations to be applied as virtual overlays onto images depicting real-world scenes) to the XR device 1310.

XR devices can include AR devices or VR devices. "Augmented reality" (AR) can include an interactive experience of a real-world environment, where physical objects or environments that reside in the real world are "augmented" or enhanced by computer-generated digital content (also referred to as virtual content or synthetic content). AR can also refer to a system that enables a combination of real and virtual worlds (e.g., mixed reality), real-time interaction, or three-dimensional (3D) registration of virtual and real objects. In some examples, a user of an AR system can perceive or interact with virtual content that appears to be overlaid on or attached to a real-world physical object.

"Virtual reality" (VR) can include a simulation experience of a virtual world environment that is distinct from the real-world environment. Computer-generated digital content is displayed in the virtual world environment. VR can refer to a system that enables a user of a VR system to be completely immersed in the virtual world environment and to interact with virtual objects presented in the virtual world environment. While at least some examples described in the present disclosure focus on XR devices that provide an AR experience, it will be appreciated that one or more aspects of the present disclosure may also be applied to VR.

A user 1306 operates the XR device 1310. The user 1306 may be a human user (e.g., a human being), a machine user (e.g., a computer configured by a software program to interact with the XR device 1310), or any suitable combination thereof (e.g., a human assisted by a machine or a machine supervised by a human).

The user 1306 is not part of the network environment 1300, but is associated with the XR device 1310. For example, where the XR device 1310 is a head-wearable apparatus, the user 1306 wears the XR device 1310 during a user session.

The XR device 1310 may have different display arrangements. In some examples, the display arrangement may include a screen or projector that displays virtual content and/or what is captured with a camera of the XR device 1310. The display may be positioned in the gaze path of the user or offset from the gaze path of the user. In some examples, the XR device 1310 includes a near-eye display system that provides a pinhole aperture array, as described in the present disclosure.

Examples of XR devices that can provide AR features include optical see-through displays and video see-through displays, also known as video pass-through displays. In optical see-through technologies, a user views the physical environment directly through transparent or semi-transparent display components, and virtual content can be rendered to appear as part of, or overlaid upon, the physical environment. In video see-through technologies, a view of the physical environment is captured by one or more cameras and then presented to the user on an opaque display (e.g., in combination with virtual content).

In some examples, the user 1306 operates an application of the XR device 1310. An XR application may be configured to provide the user 1306 with an experience triggered or enhanced by a physical object 1308, such as a two-dimensional (2D) physical object (e.g., a picture), a 3D physical object (e.g., a statue), a location (e.g., at factory), or references (e.g., perceived corners of walls or furniture, or digital codes) in a real-world environment 1302. For example, the user 1306 can point a camera of the XR device 1310 to capture an image of the physical object 1308 and a virtual overlay may be presented over the physical object 1308 via the display.

Experiences may also be triggered or enhanced by a hand or other body part of the user 1306. For example, the XR device 1310 may detect and respond to hand gestures or signals. When using some XR devices, such as head-wearable devices, the hand of the user serves as an interaction tool. As a result, the hand is often "visible" to the XR device 1310, with virtual content being rendered to appear on or close to the hand.

The XR device 1310 includes tracking components (not shown in FIG. 13). The tracking components track the pose (e.g., position and orientation) of the XR device 1310 relative to the real-world environment 1302 using image sensors (e.g., depth-enabled 3D camera and image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 1310 within the real-world environment 1302. In some examples, the tracking components track the pose of the hand (or hands) of the user 1306 or some other physical object 1308 in the real-world environment 1302.

In some examples, the server 1312 is used to detect and identify the physical object 1308 based on sensor data (e.g., image and depth data) from the XR device 1310, and determine a pose of the XR device 1310, the physical object 1308 and/or the hand of the user 1306 based on the sensor data. The server 1312 can also generate virtual content based on the pose of the XR device 1310, the physical object 1308, and/or the hand.

In some examples, the server 1312 communicates virtual content (e.g., a virtual object) to the XR device 1310. The XR device 1310 or the server 1312, or both, can perform image processing, object detection, and object tracking functions based on images captured by the XR device 1310 and one or more parameters internal or external to the XR device 1310.

The object recognition, tracking, and content rendering can be performed on either the XR device 1310, the server 1312, or a combination between the XR device 1310 and the server 1312. Accordingly, while certain functions are described herein as being performed by either an XR device or a server, the location of certain functionality may be a design choice (unless specifically indicated to the contrary). For example, it might be technically preferable to deploy particular technology and functionality within a server system initially, but later to migrate this technology and functionality to a client installed locally at the XR device where the XR device has sufficient processing capacity.

The network 1304 may be any network that enables communication between or among machines (e.g., server 1312), databases, or devices (e.g., XR device 1310). Accordingly, the network 1304 may be a wired network, a wireless network (e.g., a mobile or cellular network), or any suitable combination thereof. The network 1304 may include one or more portions that constitute a private network, a public network (e.g., the Internet), or any suitable combination thereof.

FIG. 14 is a block diagram illustrating components (e.g., modules, parts, or systems) of the XR device 1310 of FIG. 13, according to some examples. The XR device 1310 is shown in FIG. 14 to include sensors 1402, a processor 1404, a display arrangement 1406, a storage component 1408, and a communication component 1410. The XR device 1310 is further shown to include a battery 1412 and an audio system 1414. It will be appreciated that FIG. 14 is not intended to provide an exhaustive indication of components of the XR device 1310.

The sensors 1402 include one or more inertial sensors 1416, one or more depth sensors 1418, and one or more eye tracking sensors 1420. In some examples, the inertial sensor 1416 includes a combination of a gyroscope, accelerometer, and a magnetometer. In some examples, the inertial sensor 1416 includes one or more Inertial Measurement Units (IMUs). An IMU enables tracking of movement of a body by integrating the acceleration and the angular velocity measured by the IMU. An IMU can include a combination of accelerometers and gyroscopes that can determine and quantify linear acceleration and angular velocity, respectively. The values obtained can be processed to obtain the pitch, roll, and heading of the IMU and, therefore, of the body with which the IMU is associated. Signals from the accelerometers of the IMU also can be processed to obtain velocity and displacement. The IMU may also include one or more magnetometers.

The depth sensor 1418 may include one or a combination of a structured-light sensor, a time-of-flight sensor, passive stereo sensor, or an ultrasound device. The eye tracking sensor 1420 is configured to monitor the gaze direction and/or focusing distance and/or pupil size of the user, providing data for various applications, such as determining where to render virtual content of an XR application 1428. In some examples, eye tracking data such as gaze direction and/or focusing distance and/or pupil size are employed by the display arrangement 1406 to render a suitable pinhole aperture array and/or a suitable occlusion mask. The XR device 1310 may include one or multiple of these sensors, such as infrared eye tracking sensors, corneal reflection tracking sensors, or video-based eye-tracking sensors.

In addition, the sensors 1402 include one or more image sensor 1422. For example, the image sensors 1422 can include one or multiple of each of: a color camera, a thermal camera, a grayscale, global shutter tracking camera. Other examples of sensors 1402 include a proximity or location sensor (e.g., near field communication, GPS, Bluetooth™, or Wi-Fi™), an audio sensor (e.g., a microphone), or any suitable combination thereof. It is noted that the sensors 1402 described herein are for illustrative purposes and the sensors 1402 are thus not limited to the ones described above.

The processor 1404 executes or facilitates implementation of a device tracking system 1424, an object tracking system 1426, the XR application 1428, and a pinhole process controller 1430. The device tracking system 1424 estimates a pose of the XR device 1310. For example, the device tracking system 1424 uses data from cameras and inertial sensors to track a location and pose of the XR device 1310 relative to a frame of reference (e.g., real-world environment 1302). In some examples, the device tracking system 1424 uses sensor data from the sensors 1402 to determine the pose of the XR device 1310. The pose may be a determined orientation and position of the XR device 1310 in relation to the user's real-world environment 1302.

In some examples, the device tracking system 1424 continually gathers and uses updated sensor data describing movements of the XR device 1310 to determine updated poses of the XR device 1310 that indicate changes in the relative position and orientation of the XR device 1310 from the physical objects in the real-world environment 1302. In some examples, the device tracking system 1424 provides the pose of the XR device 1310 to a graphical processing unit 1432 of the display arrangement 1406.

The object tracking system 1426 enables the tracking of an object, such as the physical object 1308 of FIG. 13, or a hand of a user. The object tracking system 1426 may include a computer-operated application or system that enables a device or system to track visual features identified in images captured by one or more image sensors. In some examples, the object tracking system builds a model of a real-world environment based on the tracked visual features. An object tracking system may implement one or more object tracking machine learning models to track an object in the field of view of a user during a user session. The object tracking machine learning model may comprise a neural network trained on suitable training data to identify and track objects in a sequence of frames captured by the XR device 1310. The object tracking machine learning model may use an object's appearance, motion, landmarks, and/or other features to estimate location in subsequent frames.

In some examples, the device tracking system 1424 and/or the object tracking system 1426 implements a "SLAM" (Simultaneous Localization and Mapping) system to understand and map a physical environment in real-time. This allows, for example, the XR device 1310 to accurately place digital objects in the real world and track their position as a user moves and/or as objects move. The XR device 1310 may include a "VIO" (Visual-Inertial Odometry) system that combines data from an IMU and a camera to estimate the position and orientation of an object in real-time.

The pinhole process controller 1430 can control one or more processes that implement a pinhole aperture array-driven viewing experience in the display arrangement 1406. This may include generating the pinhole aperture array itself and/or facilitating generation of images for display via the pinhole aperture array.

When generating the pinhole array, the pinhole process controller 1430 may rely on mathematical operations that model the defocus effect as a convolution operation, such as where the original intensity distribution of an aperture is processed with the defocus point spread function. The pinhole process controller 1430 may interface with other components such as a display controller 1434 of the display arrangement 1406 to render the apertures (e.g., cross-shaped or star-shaped apertures) on one of a plurality of display structures 1436. For elemental image generation, the pinhole process controller 1430 may perform deconvolution operations such that when multiple apertures are used, the elemental images are properly arranged on the retina with shared regions correctly aligned or overlapping.

In some examples, the pinhole process controller 1430 analyzes sensor data from the XR device 1310, including data from the eye tracking sensor 1420 about pupil size and/or focusing distance and/or gaze direction. Based on this data, the pinhole process controller 1430 determines pinhole array parameters, such as the center-to-center spacing between apertures or aperture dimensions, to maintain appropriate image quality. The pinhole process controller 1430 can also dynamically update an occlusion mask to match the updated pinhole array. This processing pipeline enables the XR device 1310 to dynamically adjust parameters in response to changing viewing conditions.

The XR application 1428 may retrieve virtual content, such as a virtual object (e.g., 3D object model) or other augmentation, based on an identified physical object 1308, physical environment (or other real-world feature), or user input (e.g., a detected gesture). The graphical processing unit 1432 of the display arrangement 1406 causes display of the virtual object, augmentation, or the like.

In some examples, the XR application 1428 includes a local rendering engine that generates a visualization of a virtual object overlaid (e.g., superimposed upon, mixed with, or otherwise displayed in tandem with) on an image of the physical object 1308 (or other real-world feature) captured by an image sensor. A visualization of the virtual object may be manipulated by adjusting a position of the physical object or feature (e.g., its physical location, orientation, or both) relative to the image sensor/s. Similarly, the visualization of the virtual object may be manipulated by adjusting a pose of the XR device 1310 relative to the physical object or feature. In some examples, the XR application 1428 or the graphical processing unit 1432 works with the pinhole process controller 1430 to ensure that virtual content is appropriately rendered as elemental images.

The display arrangement 1406 may include the display controller 1434, display structures 1436 (e.g., multiple displays or display panels), and other optical elements 1438. The display structures 1436 may include one or more content display structures and one or more ray-limiting structures.

In some examples, a content display structure can display generated elemental images that account for the optical characteristics of pinholes, such as cross-shaped or star-shaped pinholes. Technologies such as LCDs, organic light-emitting diodes (OLEDs), micro-LEDs, or projection-based systems may be incorporated. In some examples, visual content is provided separately to each eye for a stereoscopic view. The ray-limiting structures may be implemented, for instance, as SLM layers, such as transparent LCD panels.

The other optical elements 1438 may include, for example, a beam splitter (e.g., non-polarizing) that serves as an optical combiner, directing light from a virtual content layer to the user's eye while allowing environmental light to pass through. Different optical configurations as possible, such as placing a beam splitter between two ray-limiting structures or between a first ray-limiting structure and an eyebox. In the latter case, an additional convex lens may be employed.

The other optical elements 1438 may further include one or more lenses, mirrors, waveguides, filters, diffusers, or prisms, which work together to present virtual content or other visual effects in a suitable manner to the user. The design of the other optical elements 1438 can vary depending on the desired field of view, image clarity, and form factor of the XR device 1310.

Referring again to the display arrangement 1406, in some examples, the graphical processing unit 1432 transfers a rendered frame to the display controller 1434. In some examples, the display controller 1434 is positioned as an intermediary between the graphical processing unit 1432 and one or more of the display structures 1436, receives the image data (e.g., rendered frame) from the graphical processing unit 1432, re-projects the frame if and as needed (e.g., by performing a warping process) based on a latest pose of the XR device 1310 (and, in some cases, object tracking pose forecasts or predictions), and provides the re-projected frame to one or more of the display structures 1436.

In some examples, the display arrangement 1406 uses elemental images to generate a light field. For example, when virtual content is to be presented to the user, a rendering pipeline converts 3D virtual content into a set of 2D elemental images, each corresponding to a specific pinhole of a pinhole aperture array. These elemental images are computed by the processor 1404 based, for example, on the desired light field or depth information and are displayed on the content display structure of the display structures 1436 such that, when viewed through the pinhole array, they reconstruct directional light rays that the user's eye interprets as coherent three-dimensional virtual content.

It will be appreciated that, in examples where an XR device includes multiple displays, each display may have a dedicated graphical processing unit and/or display controller and/or optical assembly. It will further be appreciated that where an XR device includes multiple displays, a left eye display arrangement and a right eye display arrangement may deliver separate images or video streams to each eye. Where an XR device includes multiple displays, steps may be carried out separately and substantially in parallel for each display and/or optical assembly, in some examples, and pairs of features or components may be included to cater for both eyes.

For example, an XR device may capture separate images for a left eye display and a right eye display (or for a set of right eye displays and a set of left eye displays), and render separate outputs for each eye to create a more immersive experience and to adjust the focus and convergence of the overall view of a user for a more natural, 3D view. Thus, while a single set of display arrangement components may be discussed to describe some examples, similar techniques may be applied to cover both eyes by providing a further set of display arrangement components.

In some examples, audio system 1414 enables audio input/output capabilities for the XR device 1310. The battery 1412 provides portable power to the various components of the XR device 1310.

The storage component 1408 may store various data, such as sensor data 1440, application data 1442, processed images 1444, and image/display settings 1446. In some examples, some of the data of the storage component 1408 is stored at the XR device 1310 while other data is stored at the server 1312.

Sensor data 1440 may include data obtained from one or more of the sensors 1402, such as image frames captured by the cameras and IMU data including inertial measurements. The application data 1442 may include content and instructions provided by the software applications running on the XR device 1310, such as the XR application 1428. Application data 1442 may include application instructions and features, and specifications and/or characteristics of virtual content. This data may include user interface elements, 3D models, textures, animations, and interactive elements that the user will engage with in the virtual environment.

The processed images 1444 may include images processed to extract feature data, such as pose data. The image/display settings 1446 may include parameters and options used by the XR device 1310 to process images, and render and display virtual content. The image/display settings 1446 may determine visual quality, performance, or rendering techniques used to generate the virtual environment. Examples of rendering settings may include resolution, frame rate, shading models, visual fidelity, performance parameters, and lighting techniques. Accordingly, the image/display settings 1446 may include configuration data stored within the storage component 1408 that regulates how virtual content is rendered by the XR device 1310 (e.g., via the graphical processing unit 1432).

In some examples, the image/display settings 1446 includes settings for rendering and/or adjusting a pinhole aperture array. This may include parameters related to pinhole arrangements, sizes, spacings, and algorithms for dynamic adjustment, etc.

The communication component 1410 of the XR device 1310 enables connectivity and data exchange. For example, the communication component 1410 enables wireless connectivity and data exchange with external networks and servers, such as the server 1312 of FIG. 13. This can allow certain functions described herein to be performed at the XR device 1310 and/or at the server 1312.

The communication component 1410 may allow the XR device 1310 to transmit and receive data, including software updates, machine learning models, and cloud-based processing tasks. In some examples, the communication component 1410 facilitates the offloading of computationally intensive tasks to the server 1312. Additionally, the communication component 1410 can allow for synchronization or networking with other devices in a multi-user XR environment, enabling participants to have a consistent and collaborative experience (e.g., in a multi-player AR game or an AR presentation mode).

In some examples, at least some of the components shown in FIG. 14 are configured to communicate with each other to implement aspects described herein. One or more of the components described may be implemented using software, hardware (e.g., one or more processors of one or more machines), or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

Figure 15:
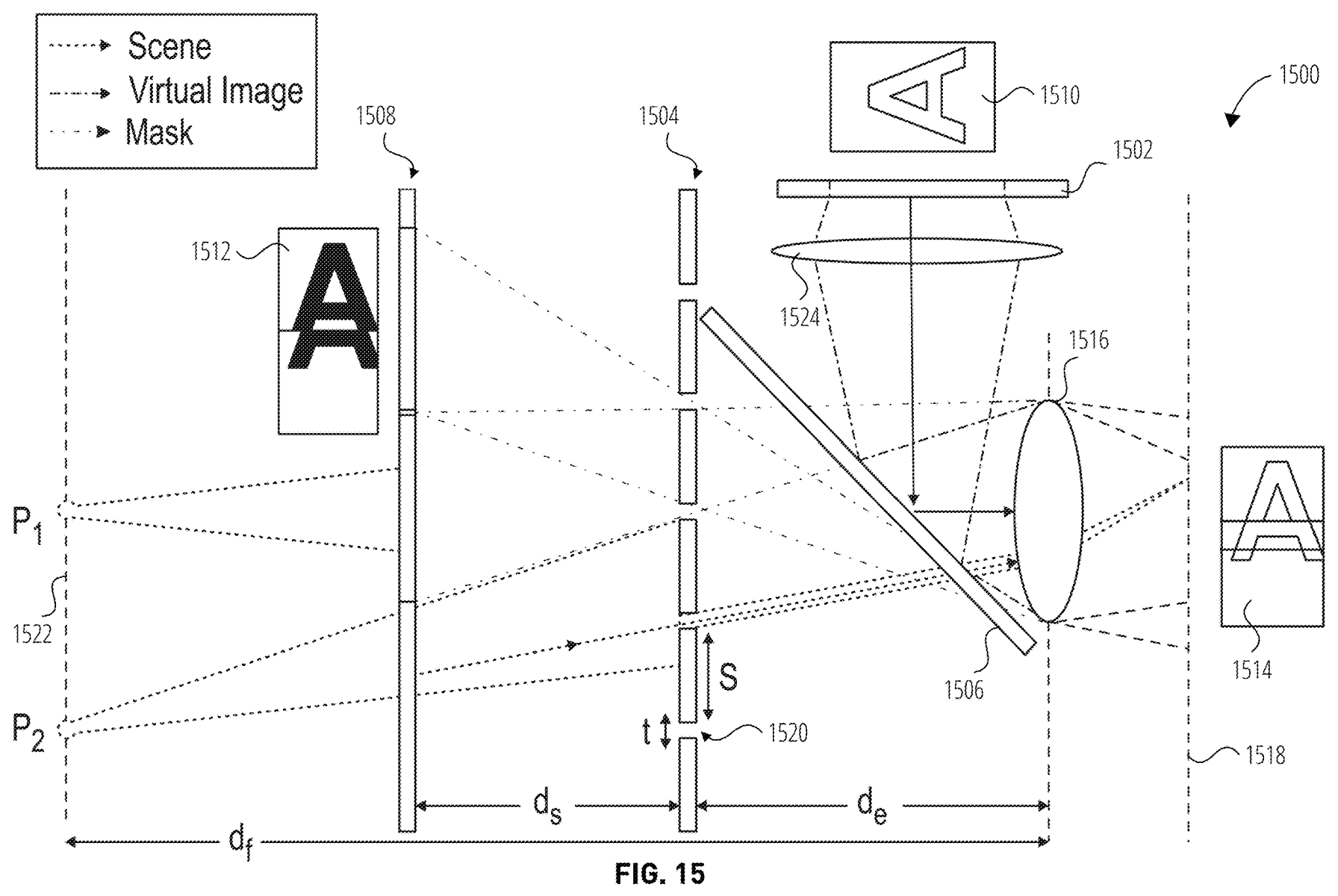

FIG. 15 shows a near-eye display system 1500 for an XR device, according to some examples. The near-eye display system 1500 may be incorporated into an XR device such as the XR device 1310 of FIG. 13 and FIG. 14. In the case of FIG. 15, the near-eye display system 1500 is used to facilitate AR capabilities and includes a content display layer 1502, a pinhole display layer 1504, and an occlusion mask display layer 1508.

The content display layer 1502 functions as a display structure for presenting virtual content to be overlaid on a user's view of the real world. The content display layer 1502 can be implemented as an LCD panel. As an example, FIG. 15 shows a rendered virtual image 1510 which is directed into a gaze path of the user by a beam splitter 1506 (e.g., a 10×10 mm or a 20×20 mm cube beam splitter). The rendered virtual image 1510 thus represents the virtual content displayed on the content display layer 1502.

The pinhole display layer 1504 serves as a first ray-limiting structure in the near-eye display system 1500 and provides an array of apertures, such as aperture 1520. The apertures are shown to have a width of t, and are spaced apart by a distance s. Examples of dimensions and pitch are provided elsewhere in the present disclosure.

In FIG. 15, $d_s$ represents the distance between the occlusion mask display layer 1508 and the pinhole display layer 1504, while $d_e$ represents the distance between the pinhole display layer 1504 and a lens 1516 (e.g., eye lens of the user). In some examples, $d_s$ and $d_e$ can each be set at between around 15 mm and 40 mm.

In some examples, the pinhole display layer 1504 is provided by a programmable SLM (e.g., LCD panel) that can dynamically render and adjust the pinhole array. The beam splitter 1506 functions as an optical combiner that directs light from the content display layer 1502 into the user's gaze path while allowing real-world light to pass through the pinhole display layer 1504 and occlusion mask display layer 1508.

The occlusion mask display layer 1508 serves as a second ray-limiting structure. The occlusion mask display layer 1508 selectively blocks environmental light from outside of the XR device. For example, the occlusion mask display layer 1508 dynamically blocks or occludes in areas where virtual content should appear. The occlusion mask display layer 1508 can be provided by a programmable SLM (e.g., LCD panel).

A rendered occlusion mask 1512 is shown to represent a pattern displayed on the occlusion mask display layer 1508 that selectively blocks portions of the real-world environment. The occlusion mask display layer 1508 may receive instructions to render an occlusion mask pattern based on what portions of the real world should be blocked.

In some examples, the mask is generated by partitioning an original mask into elemental regions. In other examples, occlusion masks can be generated using deconvolution-based approaches.

In FIG. 15, the content display layer 1502 is provided in front of the pinhole display layer 1504 (in the optical path) and the rendered virtual image 1510 is not provided by elemental images. In other words, the beam splitter 1506 is positioned between the pinhole display layer 1504 and an eyebox of the XR device, which may prevent crosstalk in the virtual image. An additional lens 1524 is provided to concentrate light as needed. In an alternative configuration, the beam splitter 1506 can be located between the pinhole display layer 1504 and the occlusion mask display layer 1508. In such cases, the lens 1524 can be removed and the content display layer 1502 can display elemental images via the pinhole display layer 1504.

As depicted in FIG. 15, the content display layer 1502 may be positioned as close as possible to the pinhole display layer 1504 and/or the occlusion mask display layer 1508 without interfering with device functionality.

An observed image 1514 is also shown in FIG. 15. The observed image 1514 represents what the user ultimately perceives via a sensor 1518 (e.g., the retina in actual use, or a camera for other purposes such as testing or demonstration). The user sees a combination of the real-world environment with virtual content overlaid and real-world objects properly occluded where necessary. Cross-shaped apertures or star-shaped apertures can be employed in the pinhole display layer 1504 to provide for improved image quality and/or better occlusion capabilities.

In use, the pinhole display layer 1504 is placed in front of a user's eye or eyes, with the occlusion mask display layer 1508 behind the pinhole display layer 1504 and extending parallel with the pinhole display layer 1504. The content display layer 1502 is outside of the gaze path of the user, with the beam splitter 1506 redirecting light from the content display layer 1502 (e.g., virtual content) to the user.

When the user focuses on a scene at a distance $d_f$ (e.g., 1 m from the user), light originating from source $P_1$ on a focal plane 1522 is blocked by the occlusion mask on the occlusion mask display layer 1508, whereas light from source $P_2$ is partially attenuated due to polarization effects induced by the liquid crystal and filtered by polarizers of occlusion mask display layer 1508. A portion of this light can still pass through the pinhole display layer 1504, forming a clear image on the sensor 1518. Without the pinhole aperture array of the pinhole display layer 1504, the occlusion mask on the occlusion mask display layer 1508 would appear blurred on the retina due to its distance from the focal plane 1522. However, with the pinhole aperture array in place, although the image plane of the occlusion mask display layer 1508 remains behind the retina when the eye is focused at $d_f$, the pinhole aperture array reduces the angular spread of light rays reaching the eye, resulting in a sharper occlusion mask on the retina. By inserting the beam splitter 1506 between the pinhole display layer 1504 and the user and adding the content display layer 1502 combined with a lens 1524 for virtual image projection, the occlusion mask effectively blocks ambient illumination at the position of the virtual content. As a result, users may perceive a clear and solid virtual image superimposed onto a sharply visible real-world scene.

SLMs (e.g., LCD panels) that can be used in such an assembly can depend on the implementation. One example is a monochrome, 60 Hz, 1024×768 pixel LCD panel with pixel pitch of 0.036 mm, and 36.9×27.6 mm active area. Inner polarizers between the pinhole display layer 1504 and occlusion mask display layer 1508, if any, may be removed to improve light transmission. The LCD panels can be used for one or multiple of the layers in the system, and may be controlled by suitable driver boards.

In the case of FIG. 15, the near-eye display system 1500 provides an optical sec-through type display. Other types of XR devices can also benefit from features described in the presentation distance. In a VR use case, virtual content can be presented to the user via a pinhole display layer such as the pinhole display layer 1504. For example, the near-eye display system 1500 can be adapted by removing the occlusion mask display layer 1508 and presenting virtual content only to the user (e.g., via a mirror) to allow for a VR use case.

Regarding the generation of elemental images, assuming pinhole display layer 1504 has only one aperture, the imaging process on the occlusion mask display layer 1508 can be approximated by:

$$I_2(x,y)=M(x,y)*H_{pinhole}(x,y),$$

where M denotes the image displayed on the occlusion mask display layer 1508 and $H_{pinhole}(x, y)$ represents the aperture's transmission distribution.

Because the aperture has a finite size, only part of the image passes through it and reaches the pupil. The effective region can essentially be regarded as a magnified projection of $I_1$ (as discussed elsewhere) onto the plane of the occlusion mask display layer 1508. The central square spot of $I_1$ can be approximated as the area corresponding to each elemental image. If multiple pinholes are used, a control system of the near-eye display system 1500 considers how each elemental image overlaps on the retina to allow the shared regions to align properly. This alignment allows the retina to reconstruct a complete image I. Therefore, it is possible to regard $M(x, y)$ as the deconvolution of I using $H_{pinhole}(x, y)$ as the kernel.

Figure 16:
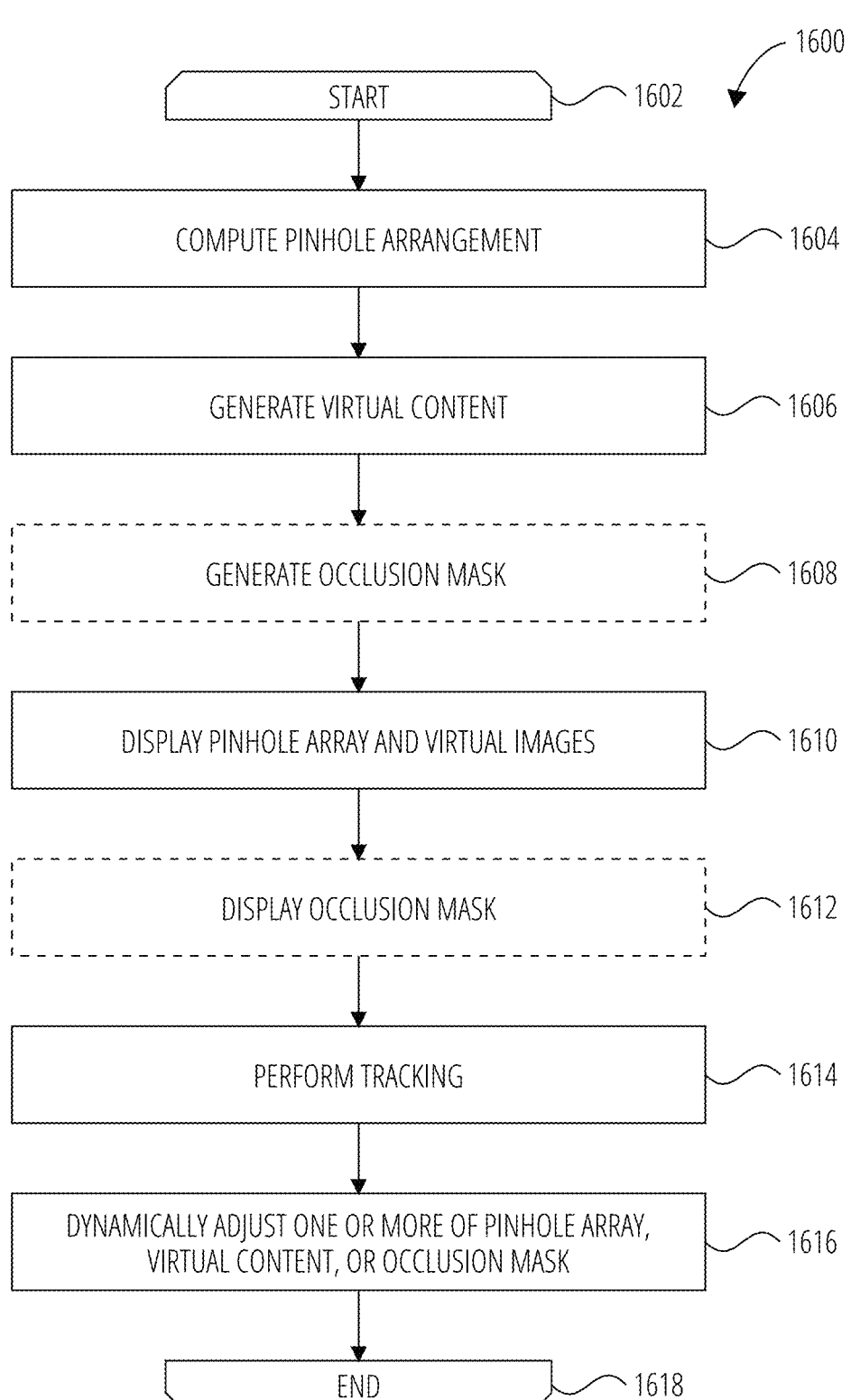
FIG. 16 is a flowchart illustrating a method for operating an XR device with a near-eye display system, according to some examples.

FIG. 16 illustrates a method 1600 for operating an XR device with a near-eye display system, according to some examples. For example, the near-eye display system 1500 of FIG. 15 can be employed by the XR device 1310 of FIG. 13 and FIG. 14 to perform at least some operations of the method 1600. Accordingly, the XR device 1310 and the near-eye display system 1500 are references as non-limiting examples below.

The method 1600 commences at opening loop element 1602. For example, a user starts using the XR device and runs an XR application. In other words, the user may start a new user session in which the XR device provides an AR or VR experience.

At operation 1604, the XR device computes a pinhole arrangement. For example, the pinhole process controller 1430 of the XR device 1310 determines an optimal or near-optimal layout of cross-shaped apertures, including their spacing and dimensions.

At operation 1606, the XR device generates virtual content. For example, where the beam splitter 1506 is placed between the eyebox and the pinhole aperture array, the pinhole display layer 1504 generates a normal image for a virtual view, while if the beam splitter 1506 is placed behind the pinhole aperture array, the pinhole display layer 1504 generates elemental images for the virtual view.

The pinhole process controller 1430 may work with the graphical processing unit 1432 to generate images to be viewed. In AR applications where occlusion is implemented, the method 1600 may include operation 1608 where the XR device further generates an occlusion mask.

The method 1600 proceeds to operation 1610 where the XR device displays the generated pinhole array (e.g., via the pinhole display layer 1504) and virtual content (e.g., via the content display layer 1502). In AR applications where occlusion is implemented, the method 1600 may include operation 1612 where the XR device further displays a generated occlusion mask (e.g., via the occlusion mask display layer 1508) to provide occlusion (e.g., to enhance virtual content quality).

At operation 1614, the XR device performs tracking during the user session. For example, the XR device tracks the hands of the user to determine control instructions or tracks other objects in the real world. With this information, the XR device can determine when and how to generate virtual content.

In some examples, the operation 1614 includes using an eye tracking sensor (e.g., the eye tracking sensor 1420) to track one or more eyes of the user. For example, the XR device checks a pupil size and/or focusing distance and/or a gaze direction of the user in real time.

At operation 1616, the XR device dynamically adjusts one or more of the pinhole array, virtual content, or occlusion mask (where present) based on tracking data. For example, the XR device updates the images displayed by the content display layer 1502 to provide suitable virtual content.

In some examples, the XR device adjusts the pinhole aperture array based on the eye tracking data. For example, the pinhole process controller 1430 detects that the user's pupil size has enlarged. In response thereto, the pinhole process controller 1430 causes the XR device to dynamically increase the pinhole pitch rendered by the pinhole display layer 1504. As another example, the pinhole process controller 1430 detects a gaze direction of the user (e.g., viewing direction) and dynamically causes shifting the pinhole aperture array to align with the gaze direction of the user.

The dynamic adjustment of the pinhole aperture array may be implemented through various techniques. In one implementation, the pinhole display layer 1504 renders different pinhole patterns at different regions of the display based on the user's gaze direction, with higher density patterns in the foveal region and lower density patterns in peripheral regions. This foveated pinhole arrangement reduces computational requirements while maintaining perceived image quality. In another implementation, the system may dynamically adjust the width of the apertures based on factors such ambient lighting conditions, pupil size, or focusing distance. The XR device can also dynamically adjust the occlusion mask to reflect or accommodate changes in the pinhole aperture array.

It will be understood that operations of the method 1600 can be continuously performed or repeated, and at least some of them may be performed in parallel during the user session. The method 1600 concludes at closing loop element 1618. For example, the user closes the XR application or powers off the XR device.

Figure 17:
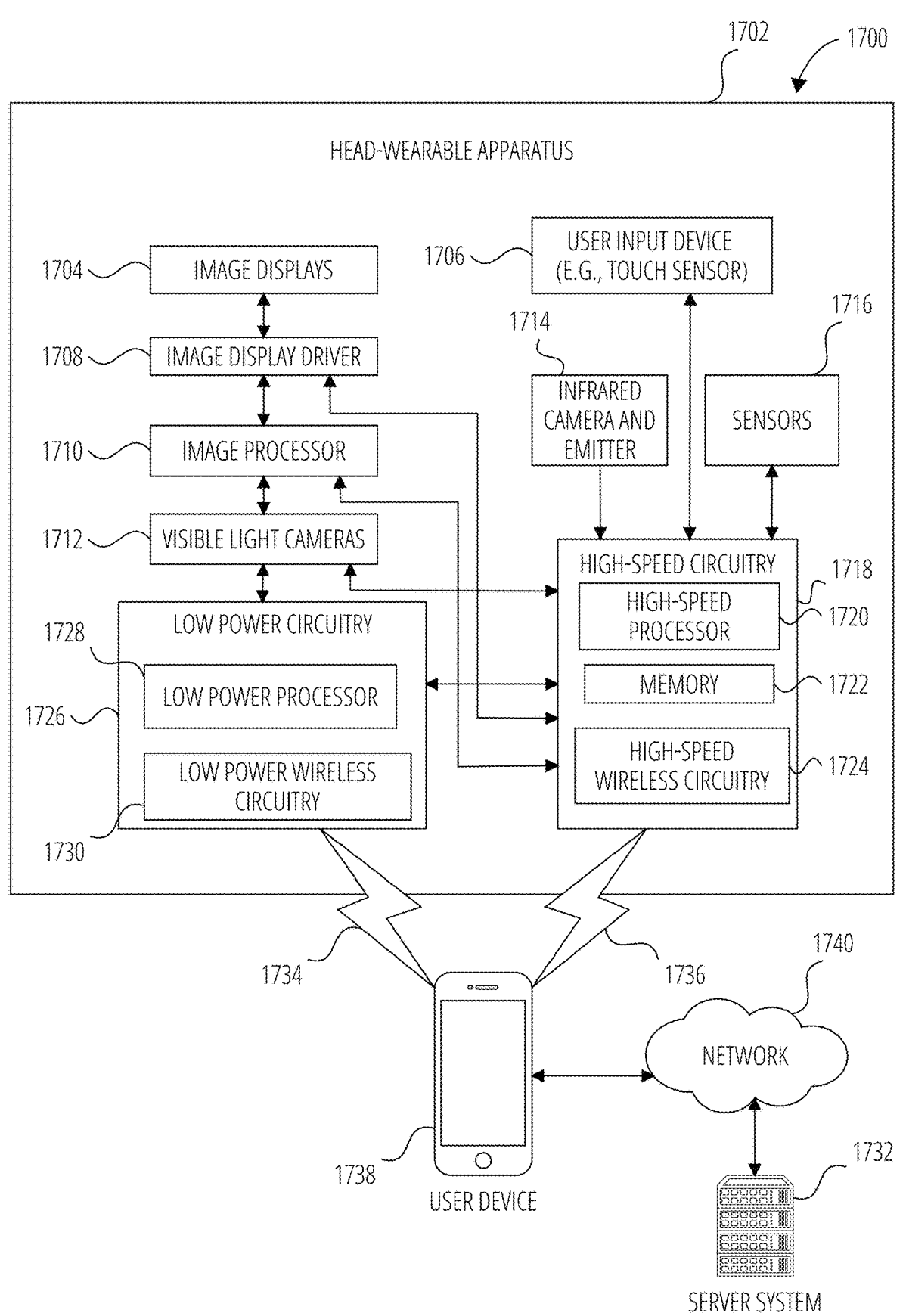
FIG. 17 is a diagrammatic illustration of a network environment in which a head-wearable apparatus can be implemented, according to some examples.

FIG. 17 illustrates a network environment 1700 in which a head-wearable apparatus 1702, such as a head-wearable XR device, can be implemented according to some examples.

FIG. 17 provides a high-level functional block diagram of an example head-wearable apparatus 1702 communicatively coupled to a user device 1738 and a server system 1732 via a suitable network 1740. One or more of the techniques described herein may be performed using the head-wearable apparatus 1702 or a network of devices similar to those shown in FIG. 17.

The head-wearable apparatus 1702 includes cameras, such as visible light cameras 1712 and an infrared camera and emitter 1714. The head-wearable apparatus 1702 includes other sensors 1716, such as motion sensors or eye tracking sensors. The user device 1738 can be capable of connecting with head-wearable apparatus 1702 using both a communication link 1734 and a communication link 1736. The user device 1738 is connected to the server system 1732 via the network 1740. The network 1740 may include any combination of wired and wireless connections.

The head-wearable apparatus 1702 includes a display arrangement that has several components. For example, the arrangement includes two image displays 1704 of an optical assembly. The two displays may include one associated with the left lateral side and one associated with the right lateral side of the head-wearable apparatus 1702. The head-wearable apparatus 1702 also includes an image display driver 1708, an image processor 1710, low power circuitry 1726, and high-speed circuitry 1718. The image displays 1704 are for presenting images and videos, including an image that can provide a graphical user interface to a user of the head-wearable apparatus 1702.

The image display driver 1708 commands and controls the image display of each of the image displays 1704. The image display driver 1708 may deliver image data directly to each image display of the image displays 1704 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The images and videos may be presented to a user by directed light from the image displays 1704 along respective optical paths to the eyes of the user. In some examples, the head-wearable apparatus 1702 utilizes one or multiple pinhole aperture arrays to display content to the user.

The head-wearable apparatus 1702 may include a frame and stems (or temples) extending from a lateral side of the frame, or another component (e.g., a head strap) to facilitate wearing of the head-wearable apparatus 1702 by a user. The head-wearable apparatus 1702 of FIG. 17 further includes a user input device 1706 (e.g., touch sensor or push button) including an input surface on the head-wearable apparatus 1702. The user input device 1706 is configured to receive, from the user, an input selection to manipulate the graphical user interface of the presented image.

At least some components shown in FIG. 17 for the head-wearable apparatus 1702 are located on one or more circuit boards, for example a printed circuit board (PCB) or flexible PCB, in the head-wearable apparatus 1702. Depicted components can be located in frames, chunks, hinges, or bridges of the head-wearable apparatus 1702, for example. Left and right sides of the head-wearable apparatus 1702 may each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 1702 includes a memory 1722 which stores instructions to perform a subset or all of the functions described herein. The memory 1722 can also include a storage device. As further shown in FIG. 17, the high-speed circuitry 1718 includes a high-speed processor 1720, the memory 1722, and high-speed wireless circuitry 1724. In FIG. 17, the image display driver 1708 is coupled to the high-speed circuitry 1718 and operated by the high-speed processor 1720 in order to drive the left and right image displays of the image displays 1704. The high-speed processor 1720 may be any processor capable of managing high-speed communications and operation of any general computing system needed for the head-wearable apparatus 1702. The high-speed processor 1720 includes processing resources needed for managing high-speed data transfers over the communication link 1736 to a wireless local area network (WLAN) using high-speed wireless circuitry 1724. In certain examples, the high-speed processor 1720 executes an operating system such as a LINUX operating system or other such operating system of the head-wearable apparatus 1702 and the operating system is stored in memory 1722 for execution. In addition to any other responsibilities, the high-speed processor 1720 executing a software architecture for the head-wearable apparatus 1702 is used to manage data transfers with high-speed wireless circuitry 1724. In certain examples, high-speed wireless circuitry 1724 is configured to implement Institute of Electrical and Electronic Engineers (IEEE) 1702.11 communication standards, also referred to herein as Wi-Fi™. In other examples, other high-speed communications standards may be implemented by high-speed wireless circuitry 1724.

The low power wireless circuitry 1730 and the high-speed wireless circuitry 1724 of the head-wearable apparatus 1702 can include short range transceivers (Bluetooth™) and wireless wide, local, or wide area network transceivers (e.g., cellular or Wi-Fi™). The user device 1738, including the transceivers communicating via the communication link 1734 and communication link 1736, may be implemented using details of the architecture of the head-wearable apparatus 1702, as can other elements of the network 1740.

The memory 1722 may include any storage device capable of storing various data and applications, including, among other things, camera data generated by the visible light cameras 1712, sensors 1716, and the image processor 1710, as well as images generated for display by the image display driver 1708 on the image displays of the image displays 1704. While the memory 1722 is shown as integrated with the high-speed circuitry 1718, in other examples, the memory 1722 may be an independent standalone element of the head-wearable apparatus 1702. In certain such examples, electrical routing lines may provide a connection through a chip that includes the high-speed processor 1720 from the image processor 1710 or low power processor 1728 to the memory 1722. In other examples, the high-speed processor 1720 may manage addressing of memory 1722 such that the low power processor 1728 will boot the high-speed processor 1720 any time that a read or write operation involving memory 1722 is needed.

As shown in FIG. 17, the low power processor 1728 or high-speed processor 1720 of the head-wearable apparatus 1702 can be coupled to the camera (visible light cameras 1712, or infrared camera and emitter 1714), the image display driver 1708, the user input device 1706 (e.g., touch sensor or push button), and the memory 1722. The head-wearable apparatus 1702 also includes sensors 1716, which may be the motion components 1934, position components 1938, environmental components 1936, and biometric components 1932, e.g., as described below with reference to FIG. 19. In particular, motion components 1934 and position components 1938 are used by the head-wearable apparatus 1702 to determine and keep track of the position and orientation (the "pose") of the head-wearable apparatus 1702 relative to a frame of reference or another object, in conjunction with a video feed from one of the visible light cameras 1712, using for example techniques such as structure from motion (SfM) or VIO.

In some examples, and as shown in FIG. 17, the head-wearable apparatus 1702 is connected with a host computer.

For example, the head-wearable apparatus 1702 is paired with the user device 1738 via the communication link 1736 or connected to the server system 1732 via the network 1740. The server system 1732 may be one or more computing devices as part of a service or network computing system, for example, that include a processor, a memory, and network communication interface to communicate over the network 1740 with the user device 1738 and head-wearable apparatus 1702.

The user device 1738 includes a processor and a network communication interface coupled to the processor. The network communication interface allows for communication over the network 1740, communication link 1734 or communication link 1736. The user device 1738 can further store at least portions of the instructions for implementing functionality described herein.

Output components of the head-wearable apparatus 1702 include visual components, such as a display (e.g., one or more liquid-crystal display (LCD)), one or more plasma display panel (PDP), one or more light emitting diode (LED) display, one or more projector, or one or more waveguide. The image displays 1704 described above are examples of such a display. In some examples, the image displays 1704 are driven by the image display driver 1708.

The output components of the head-wearable apparatus 1702 may further include acoustic components (e.g., speakers), haptic components (e.g., a vibratory motor), other signal generators, and so forth. The input components of the head-wearable apparatus 1702, the user device 1738, and server system 1732, such as the user input device 1706, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 1702 may optionally include additional peripheral device elements. Such peripheral device elements may include biometric sensors, additional sensors, or display elements integrated with the head-wearable apparatus 1702. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 1736 from the user device 1738 via the low power wireless circuitry 1730 or high-speed wireless circuitry 1724.

Figure 18:
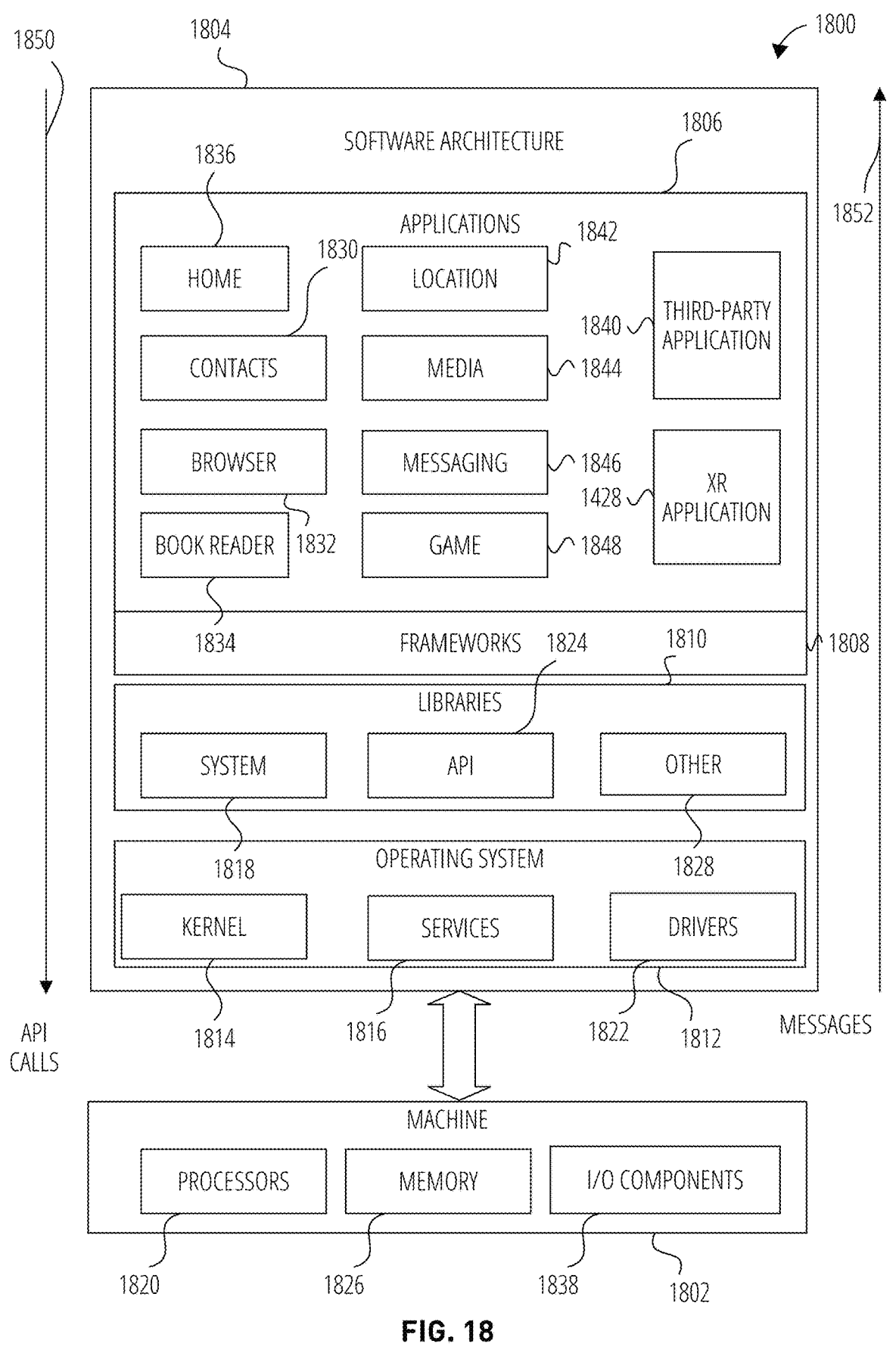

FIG. 18 is a block diagram 1800 illustrating a software architecture 1804, which can be installed on one or more of the devices described herein, according to some examples. The software architecture 1804 is supported by hardware such as a machine 1802 that includes processors 1820, memory 1826, and I/O components 1838. In this example, the software architecture 1804 can be conceptualized as a stack of layers, where each layer provides a particular functionality. The software architecture 1804 includes layers such as an operating system 1812, libraries 1810, frameworks 1808, and applications 1806. Operationally, the applications 1806 invoke API calls 1850, through the software stack and receive messages 1852 in response to the API calls 1850.

The operating system 1812 manages hardware resources and provides common services. The operating system 1812 includes, for example, a kernel 1814, services 1816, and drivers 1822. The kernel 1814 acts as an abstraction layer between the hardware and the other software layers. For example, the kernel 1814 provides memory management, processor management (e.g., scheduling), component management, networking, and security settings, among other functionality. The services 1816 can provide other common services for the other software layers. The drivers 1822 are responsible for controlling or interfacing with the underlying hardware. For instance, the drivers 1822 can include display drivers, camera drivers, Bluetooth™ or Bluetooth™ Low Energy drivers, flash memory drivers, serial communication drivers (e.g., Universal Serial Bus (USB) drivers), Wi-Fi™ drivers, audio drivers, power management drivers, and so forth.

The libraries 1810 provide a low-level common infrastructure used by the applications 1806. The libraries 1810 can include system libraries 1818 (e.g., C standard library) that provide functions such as memory allocation functions, string manipulation functions, mathematic functions, and the like. In addition, the libraries 1810 can include API libraries 1824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and 3D in a graphic content on a display), database libraries (e.g., SQLite to provide various relational database functions), web libraries (e.g., WebKit to provide web browsing functionality), and the like. The libraries 1810 can also include a wide variety of other libraries 1828 to provide many other APIs to the applications 1806.

The frameworks 1808 provide a high-level common infrastructure that is used by the applications 1806. For example, the frameworks 1808 provide various graphical user interface (GUI) functions, high-level resource management, and high-level location services. The frameworks 1808 can provide a broad spectrum of other APIs that can be used by the applications 1806, some of which may be specific to a particular operating system or platform.

In some examples, the applications 1806 may include a home application 1836, a contacts application 1830, a browser application 1832, a book reader application 1834, a location application 1842, a media application 1844, a messaging application 1846, a game application 1848, and a broad assortment of other applications such as a third-party application 1840. In some examples, the applications 1806 are programs that execute functions defined in the programs. Various programming languages can be employed to create one or more of the applications 1806, structured in a variety of manners, such as object-oriented programming languages (e.g., Objective-C, Java, or C++) or procedural programming languages (e.g., C or assembly language). In some examples, the third-party application 1840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 18, the third-party application 1840 can invoke the API calls 1850 provided by the operating system 1812 to facilitate functionality described herein. The applications 1806 may include an XR application such as the XR application 1428 described herein, according to some examples.

Figure 19:
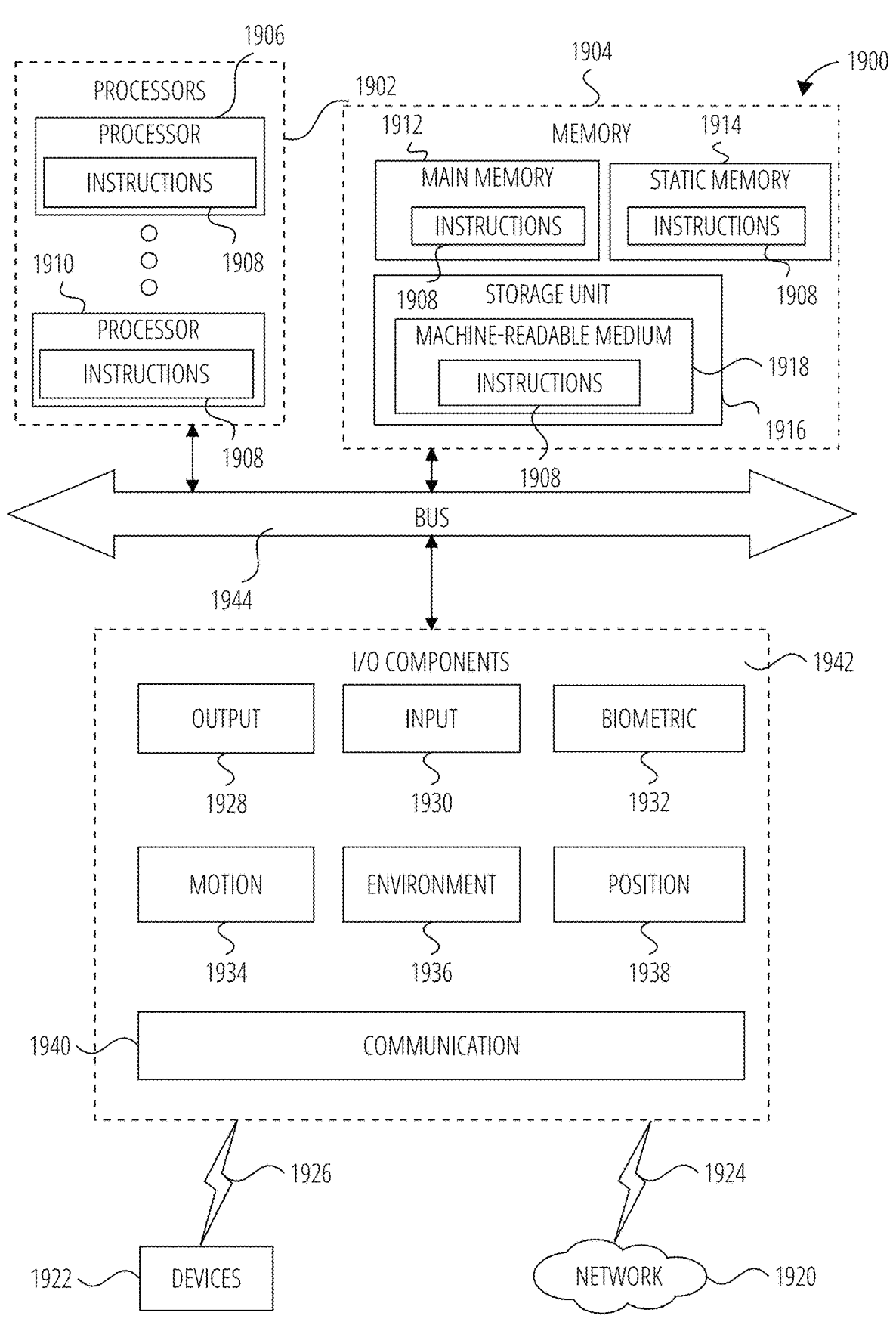
FIG. 19 is a diagrammatic illustration of a machine in the form of a computer system within which a set of instructions may be executed for causing the machine to perform any one or more of the methodologies discussed herein, according to some examples.

FIG. 19 is a diagrammatic representation of a machine 1900 within which instructions 1908 (e.g., software, a program, an application, an applet, an app, or other executable code) for causing the machine 1900 to perform any one or more of the methodologies discussed herein may be executed, according to some examples. For example, the instructions 1908 may cause the machine 1900 to execute any one or more of the methods described herein. The instructions 1908 transform the general, non-programmed machine 1900 into a particular machine 1900 programmed to carry out the described and illustrated functions in the manner described. The machine 1900 may operate as a standalone device or may be coupled (e.g., networked) to other machines.

In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, a smart home device (e.g., a smart appliance), other smart devices, a web appliance, a network router, a network switch, a network bridge, or any machine capable of executing the instructions 1908, sequentially or otherwise, that specify actions to be taken by the machine 1900. Further, while only a single machine 1900 is illustrated, the term "machine" shall also be taken to include a collection of machines that individually or jointly execute the instructions 1908 to perform any one or more of the methodologies discussed herein.

The machine 1900 may include processors 1902, memory 1904, and I/O components 1942, which may be configured to communicate with each other via a bus 1944. In some examples, the processors 1902 may include, for example, a processor 1906 and a processor 1910 that execute the instructions 1908. Although FIG. 19 shows multiple processors 1902, the machine 1900 may include a single processor with a single core, a single processor with multiple cores (e.g., a multi-core processor), multiple processors with a single core, multiple processors with multiples cores, or any combination thereof.

The memory 1904 includes a main memory 1912, a static memory 1914, and a storage unit 1916, accessible to the processors via the bus 1944. The main memory 1904, the static memory 1914, and storage unit 1916 store the instructions 1908 embodying any one or more of the methodologies or functions described herein. The instructions 1908 may also reside, completely or partially, within the main memory 1912, within the static memory 1914, within machine-readable medium 1918 within the storage unit 1916, within at least one of the processors, or any suitable combination thereof, during execution thereof by the machine 1900.

The I/O components 1942 may include a wide variety of components to receive input, provide output, produce output, transmit information, exchange information, capture measurements, and so on. The specific I/O components 1942 that are included in a particular machine will depend on the type of machine. For example, portable machines such as mobile phones may include a touch input device or other such input mechanisms, while a headless server machine will likely not include such a touch input device. It will be appreciated that the I/O components 1942 may include many other components that are not shown in FIG. 19. In various examples, the I/O components 1942 may include output components 1928 and input components 1930. The output components 1928 may include visual components (e.g., a display such as a plasma display panel (PDP), a light emitting diode (LED) display, a LCD, a projector, or a cathode ray tube (CRT)), acoustic components (e.g., speakers), haptic components (e.g., a vibratory motor, resistance mechanisms), other signal generators, and so forth. The input components 1930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1942 may include biometric components 1932, motion components 1934, environmental components 1936, or position components 1938, among a wide array of other components. For example, the biometric components 1932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1934 include acceleration sensor components (e.g., accelerometer), gravitation sensor components, rotation sensor components (e.g., gyroscope), and so forth. The environmental components 1936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1938 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1942 further include communication components 1940 operable to couple the machine 1900 to a network 1920 or devices 1922 via a coupling 1924 and a coupling 1926, respectively. For example, the communication components 1940 may include a network interface component or another suitable device to interface with the network 1920. In further examples, the communication components 1940 may include wired communication components, wireless communication components, cellular communication components, Near Field Communication (NFC) components, Bluetooth™ components, Wi-Fi™ components, and other communication components to provide communication via other modalities. The devices 1922 may be another machine or any of a wide variety of peripheral devices (e.g., a peripheral device coupled via a USB).

Moreover, the communication components 1940 may detect identifiers or include components operable to detect identifiers. For example, the communication components 1940 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1940, such as location via Internet Protocol (IP) geolocation, location via Wi-Fi™ signal triangulation, location via detecting an NFC beacon signal that may indicate a particular location, and so forth.

The various memories (e.g., memory 1904, main memory 1912, static memory 1914, and/or memory of the processors 1902) and/or storage unit 1916 may store one or more sets of instructions and data structures (e.g., software) embodying or used by any one or more of the methodologies or functions described herein. These instructions (e.g., the instructions 1908), when executed by processors 1902, cause various operations to implement the disclosed examples.

The instructions 1908 may be transmitted or received over the network 1920, using a transmission medium, via a network interface device (e.g., a network interface component included in the communication components 1940) and using any one of a number of well-known transfer protocols (e.g., hypertext transfer protocol (HTTP)). Similarly, the instructions 1908 may be transmitted or received using a transmission medium via the coupling 1926 (e.g., a peer-to-peer coupling) to the devices 1922.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), an FPGA, a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, Very Long Instruction Word (VLIW), vector processing, or Single Instruction, Multiple Data (SIMD) that allow each core to run separate instruction streams concurrently. A processor may be emulated in software, running on a physical processor, as a virtual processor or virtual circuit. The virtual processor may behave like an independent processor but is implemented in software rather than hardware.

Unless the context clearly requires otherwise, in the present disclosure, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a near-eye display system comprising a ray-limiting structure to provide a pinhole aperture array with a plurality of apertures, wherein each of the plurality of apertures has a shape defined by radially extending elements.

In Example 2, the subject matter of Example 1 includes, wherein the plurality of apertures comprises at least one of: a plurality of substantially cross-shaped apertures, or a plurality of substantially star-shaped apertures.

In Example 3, the subject matter of Examples 1-2 includes, wherein the ray-limiting structure comprises a programmable display to dynamically render the pinhole aperture array.

In Example 4, the subject matter of Examples 1-3 includes, wherein the ray-limiting structure comprises a spatial light modulator (SLM) layer.

In Example 5, the subject matter of Example 4 includes, wherein the SLM layer comprises a liquid-crystal display (LCD) panel.

In Example 6, the subject matter of Examples 1-5 includes, wherein each of at least a subset of the plurality of apertures has a non-uniform light transmission profile.

In Example 7, the subject matter of Examples 1-6 includes, a content display structure to display virtual content.

In Example 8, the subject matter of Example 7 includes, wherein the virtual content is displayed via elemental images.

In Example 9, the subject matter of Examples 7-8 includes, an optical combiner to direct light from the content display structure into a gaze path of a user of the near-eye display system.

In Example 10, the subject matter of Examples 1-9 includes, wherein the ray-limiting structure is a first ray-limiting structure, the near-eye display system further comprising a second ray-limiting structure that is spaced apart from the first ray-limiting structure, the second ray-limiting structure to selectively block environmental light.

In Example 11, the subject matter of Example 10 includes, wherein the second ray-limiting structure is to provide an occlusion mask.

In Example 12, the subject matter of Examples 10-11 includes, wherein the second ray-limiting structure comprises an SLM layer.

In Example 13, the subject matter of Examples 1-12 includes, an eye tracker to track at least one eye of a user of the near-eye display system to obtain eye tracking data, and the ray-limiting structure is to dynamically adjust the pinhole aperture array based on the eye tracking data.

In Example 14, the subject matter of Example 13 includes, wherein the eye tracking data comprises at least one of pupil size data or gaze direction data.

In Example 15, the subject matter of Examples 13-14 includes, wherein the ray-limiting structure is a first ray-limiting structure, the near-eye display system further comprising a second ray-limiting structure that is spaced apart from the first ray-limiting structure, the second ray-limiting structure to selectively block environmental light, and wherein the second ray-limiting structure is to dynamically adjust an occlusion mask based on the eye tracking data.

Example 16 is an extended reality (XR) device comprising: a display system comprising a ray-limiting structure to provide a pinhole aperture array with a plurality of apertures, wherein each of the plurality of apertures has a shape defined by radially extending elements.

In Example 17, the subject matter of Example 16 includes, wherein the ray-limiting structure comprises a programmable display to dynamically render the pinhole aperture array.

In Example 18, the subject matter of Examples 16-17 includes, a content display structure to display virtual content.

In Example 19, the subject matter of Examples 16-18 includes, wherein the ray-limiting structure is a first ray-limiting structure, the XR device further comprising a second ray-limiting structure that is spaced apart from the first ray-limiting structure, the second ray-limiting structure to selectively block environmental light.

Example 20 is a method comprising: providing an extended reality (XR) device comprising a near-eye display system; and generating, by a ray-limiting structure of the near-eye display system, a pinhole aperture array with a plurality of apertures, wherein each of the plurality of apertures has a shape defined by radially extending elements.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A near-eye display system comprising a ray-limiting structure to provide a pinhole aperture array with a plurality of apertures, wherein each of the plurality of apertures has a shape defined by radially extending elements.

2. The near-eye display system of claim 1, wherein the plurality of apertures comprises at least one of: a plurality of substantially cross-shaped apertures, or a plurality of substantially star-shaped apertures.

3. The near-eye display system of claim 1, wherein the ray-limiting structure comprises a programmable display to dynamically render the pinhole aperture array.

4. The near-eye display system of claim 1, wherein the ray-limiting structure comprises a spatial light modulator (SLM) layer.

5. The near-eye display system of claim 4, wherein the SLM layer comprises a liquid-crystal display (LCD) panel.

6. The near-eye display system of claim 1, wherein each of at least a subset of the plurality of apertures has a non-uniform light transmission profile.

7. The near-eye display system of claim 1, further comprising a content display structure to display virtual content.

8. The near-eye display system of claim 7, wherein the virtual content is displayed via elemental images.

9. The near-eye display system of claim 7, further comprising an optical combiner to direct light from the content display structure into a gaze path of a user of the near-eye display system.

10. The near-eye display system of claim 1, wherein the ray-limiting structure is a first ray-limiting structure, the near-eye display system further comprising a second ray-limiting structure that is spaced apart from the first ray-limiting structure, the second ray-limiting structure to selectively block environmental light.

11. The near-eye display system of claim 10, wherein the second ray-limiting structure is to provide an occlusion mask.

12. The near-eye display system of claim 10, wherein the second ray-limiting structure comprises an SLM layer.

13. The near-eye display system of claim 1, further comprising an eye tracker to track at least one eye of a user of the near-eye display system to obtain eye tracking data, and the ray-limiting structure is to dynamically adjust the pinhole aperture array based on the eye tracking data.

14. The near-eye display system of claim 13, wherein the eye tracking data comprises at least one of pupil size data, focusing distance data, or gaze direction data.

15. The near-eye display system of claim 13, wherein the ray-limiting structure is a first ray-limiting structure, the near-eye display system further comprising a second ray-limiting structure that is spaced apart from the first ray-limiting structure, the second ray-limiting structure to selectively block environmental light, and wherein the second ray-limiting structure is to dynamically adjust an occlusion mask based on the eye tracking data.

16. An extended reality (XR) device comprising:

a display system comprising a ray-limiting structure to provide a pinhole aperture array with a plurality of apertures, wherein each of the plurality of apertures has a shape defined by radially extending elements.

17. The XR device of claim 16, wherein the ray-limiting structure comprises a programmable display to dynamically render the pinhole aperture array.

18. The XR device of claim 16, further comprising:

a content display structure to display virtual content.

19. The XR device of claim 16, wherein the ray-limiting structure is a first ray-limiting structure, the XR device further comprising a second ray-limiting structure that is spaced apart from the first ray-limiting structure, the second ray-limiting structure to selectively block environmental light.

20. A method comprising:

providing an extended reality (XR) device comprising a near-eye display system; and generating, by a ray-limiting structure of the near-eye display system, a pinhole aperture array with a plurality of apertures, wherein each of the plurality of apertures has a shape defined by radially extending elements.

* * * * *